United States Patent
Seth et al.

(10) Patent No.: US 11,829,712 B2
(45) Date of Patent: Nov. 28, 2023

(54) MANAGEMENT OF PRESENTATION CONTENT INCLUDING GENERATION AND RENDERING OF A TRANSPARENT GLASSBOARD REPRESENTATION

(71) Applicant: Microsoft Technology Licensing, LLC, Redmond, WA (US)

(72) Inventors: Rolly Seth, Redmond, WA (US); Rajat Chamria, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/323,618

(22) Filed: May 18, 2021

(65) Prior Publication Data
US 2022/0374590 A1  Nov. 24, 2022

(51) Int. Cl.
*G06F 40/186* (2020.01)
*G06F 40/103* (2020.01)
(Continued)

(52) U.S. Cl.
CPC ............ *G06F 40/186* (2020.01); *G06F 3/017* (2013.01); *G06F 3/0481* (2013.01);
(Continued)

(58) Field of Classification Search
CPC ......... G06F 40/186; G06F 40/103–117; G06F 3/017; G06F 3/0481–0483;
(Continued)

(56) References Cited

U.S. PATENT DOCUMENTS 4,847,678 A   7/1989  Mccauley
8,831,505 B1  9/2014  Seshadri
(Continued)

OTHER PUBLICATIONS

TouchCastApp. "Introducing TouchCast". Jun. 27, 2013. Youtube <https://www.youtube.com/watch?v=uyLK8N4ovdg> (Year: 2013).*
(Continued)

*Primary Examiner* — Liang Y Li

(57) ABSTRACT

The present disclosure relates to management of transparent glassboard representations, where a virtual glassboard is comprehensively integrated with presentation content. An exemplary transparent glassboard representation provides a layered configuration of content layers in an ordered arrangement to maximize integration of a virtual glassboard within presentation content. Some examples of the present disclosure comprise those where a graphical user interface (GUI) object is managed during the design of presentation content. In further examples, the present disclosure pertains to management for rendering of a transparent glassboard representation within a GUI of a host application/service endpoint during real-time (or near real-time) presentation. Further non-limiting examples apply trained artificial intelligence (AI) processing to efficiency automate management of transparent glassboard representations both in a design phase and presentation phase for managing presentation content. Representations of presentation content, comprising a transparent glassboard representation, may be synchronized through a plurality of different host applications/services.

20 Claims, 11 Drawing Sheets

(51) Int. Cl.
    *G06F 3/01*      (2006.01)
    *G06F 3/0481*    (2022.01)
    *G06F 3/0484*    (2022.01)
    *H04L 65/4038*   (2022.01)

(52) U.S. Cl.
    CPc .......... *G06F 3/0484* (2013.01); *G06F 40/103*
    (2020.01); *H04L 65/4038* (2013.01)

(58) Field of Classification Search
    CPC ......... G06F 3/0484–0486; G06F 3/048; G06F
    40/171; G06F 16/4393; G06Q 10/10;
    G06Q 10/101; G11B 27/031–038; H04N
    7/15–157; H04L 65/403–4053; H04L
    65/4015
    See application file for complete search history.

(56) References Cited

U.S. PATENT DOCUMENTS

| | | | |
|---|---|---|---|
| 9,674,243 B2* | 6/2017 | Bader-Natal | H04L 65/1093 |
| 10,986,301 B1 | 4/2021 | Schanz | |
| 11,263,397 B1 | 3/2022 | Yu et al. | |
| 11,265,181 B1* | 3/2022 | Springer | H04N 21/2743 |
| 2005/0160368 A1 | 7/2005 | Liu et al. | |
| 2007/0081075 A1 | 4/2007 | Canova et al. | |
| 2010/0031152 A1* | 2/2010 | Villaron | G06F 3/0481 |
| | | | 715/731 |
| 2010/0037151 A1 | 2/2010 | Ackerman et al. | |
| 2011/0109751 A1 | 5/2011 | Chang et al. | |
| 2012/0023407 A1* | 1/2012 | Taylor | G06F 40/106 |
| | | | 715/731 |
| 2012/0113095 A1* | 5/2012 | Hwang | G06F 3/0486 |
| | | | 345/419 |
| 2012/0206577 A1 | 8/2012 | Guckenberger et al. | |
| 2012/0310750 A1 | 12/2012 | Schutzbank et al. | |
| 2013/0215292 A1* | 8/2013 | Reichelt | G06T 19/006 |
| | | | 348/E5.051 |
| 2014/0072945 A1 | 3/2014 | Gu et al. | |
| 2014/0184721 A1 | 7/2014 | Zhang et al. | |
| 2014/0232814 A1 | 8/2014 | Malhotra et al. | |
| 2014/0362165 A1 | 12/2014 | Fleszar et al. | |
| 2015/0058754 A1 | 2/2015 | Rauh | |
| 2015/0121189 A1* | 4/2015 | Titterington | G06F 40/169 |
| | | | 715/230 |
| 2015/0350269 A1* | 12/2015 | Shibata | G06F 3/0483 |
| | | | 715/202 |
| 2017/0039867 A1* | 2/2017 | Fieldman | H04N 21/2187 |
| 2017/0237986 A1 | 8/2017 | Choi et al. | |
| 2018/0160076 A1* | 6/2018 | Ozaki | H04N 7/147 |
| 2018/0239504 A1 | 8/2018 | Huang et al. | |
| 2019/0088153 A1 | 3/2019 | Bader-natal et al. | |
| 2019/0205962 A1 | 7/2019 | Piramuthu et al. | |
| 2020/0081606 A1* | 3/2020 | Mo | G06F 3/0481 |
| 2020/0126437 A1 | 4/2020 | Fieldman | |
| 2020/0137316 A1 | 4/2020 | Zavesky et al. | |
| 2020/0371647 A1 | 11/2020 | Gerges et al. | |
| 2020/0388060 A1* | 12/2020 | Rimon | G06T 3/40 |
| 2020/0412780 A1 | 12/2020 | Devendran et al. | |
| 2021/0273892 A1 | 9/2021 | Rakshit | |
| 2022/0086200 A1* | 3/2022 | Lansing | H04L 65/611 |
| 2022/0121354 A1* | 4/2022 | Xia | G06F 3/04847 |
| 2022/0180052 A1 | 6/2022 | Yu et al. | |
| 2023/0066504 A1 | 3/2023 | Daha et al. | |

OTHER PUBLICATIONS

Williams, Karen. PowerPoint Tip—Adding a Whiteboard to your Presentation. Oct. 1, 2015. Microassist.com. <https://www.microassist.com/software-tips/powerpoint-tip-adding-a-whiteboard-to-your-presentation/> (Year: 2015).*
"Live Cameras in PowerPoint (Webcams, IP Cameras and Streaming Videos)", Retrieved From: https://www.presentationpoint.com/blog/live-cameras-in-powerpoint/, Apr. 17, 2020, 5 Pages.
"Non Final Office Action Issued In U.S. Appl. No. 17/115,433", dated May 26, 2021, 16 Pages.
Aries, Benjamin, "Adding Live Streaming in PowerPoint", Retrieved From: https://web.archive.org/web/20170617163731/https://itstillworks.com/adding-live-streaming-powerpoint-37326.html, Jun. 17, 2017, 3 Pages.
"EGlass", Retrieved from: https://web.archive.org/web/20210311184203/https://www.learning.glass/, Mar. 11, 2021, 6 pages.
Hanselman, Scott, "Transparent Glass Whiteboard in Microsoft Teams or Zoom with OBS for Free!", Retrieved from: https://www.youtube.com/watch?v=-oaikJCR6ec, Feb. 3, 2021, 5 Pages.
Stratvert, Kevin, "Top 5 Video Camera Hacks in Microsoft Teams", Retrieved from: https://www.youtube.com/watch?v=1vCua6RGfA8, Feb. 12, 2021, 4 Pages.
"Non Provisional Application Filed in U.S. Appl. No. 17/115,433", filed Dec. 8, 2020, 75 Pages.
"International Search Report and Written Opinion Issued in PCT Application No. PCT/US21/058870", dated Feb. 23, 2022, 13 Pages.
"Notice of Allowance Issued in U.S. Appl. No. 17/579,846", dated Oct. 5, 2022, 12 Pages.
"International Search Report and Written Opinion Issued in PCT Application No. PCT/US22/026246", dated Aug. 3, 2022, 12 Pages.
"Notice of Allowance Issued in U.S. Appl. No. 17/579,846", dated Feb. 15, 2023, 10 Pages.
"Notice of Allowance Issued in U.S. Appl. No. 17/579,846", dated May 22, 2023, 10 Pages.
"Non Final Office Action Issued in U.S. Appl. No. 17/458,003", dated Apr. 12, 2023, 16 Pages.
"International Search Report and Written Opinion Issued in PCT Application No. PCT/US22/036066", dated Oct. 5, 2022, 14 Pages.
"Notice of Allowance Issued in U.S. Appl. No. 17/579,846", dated Aug. 11, 2023, 8 pages.

* cited by examiner

100

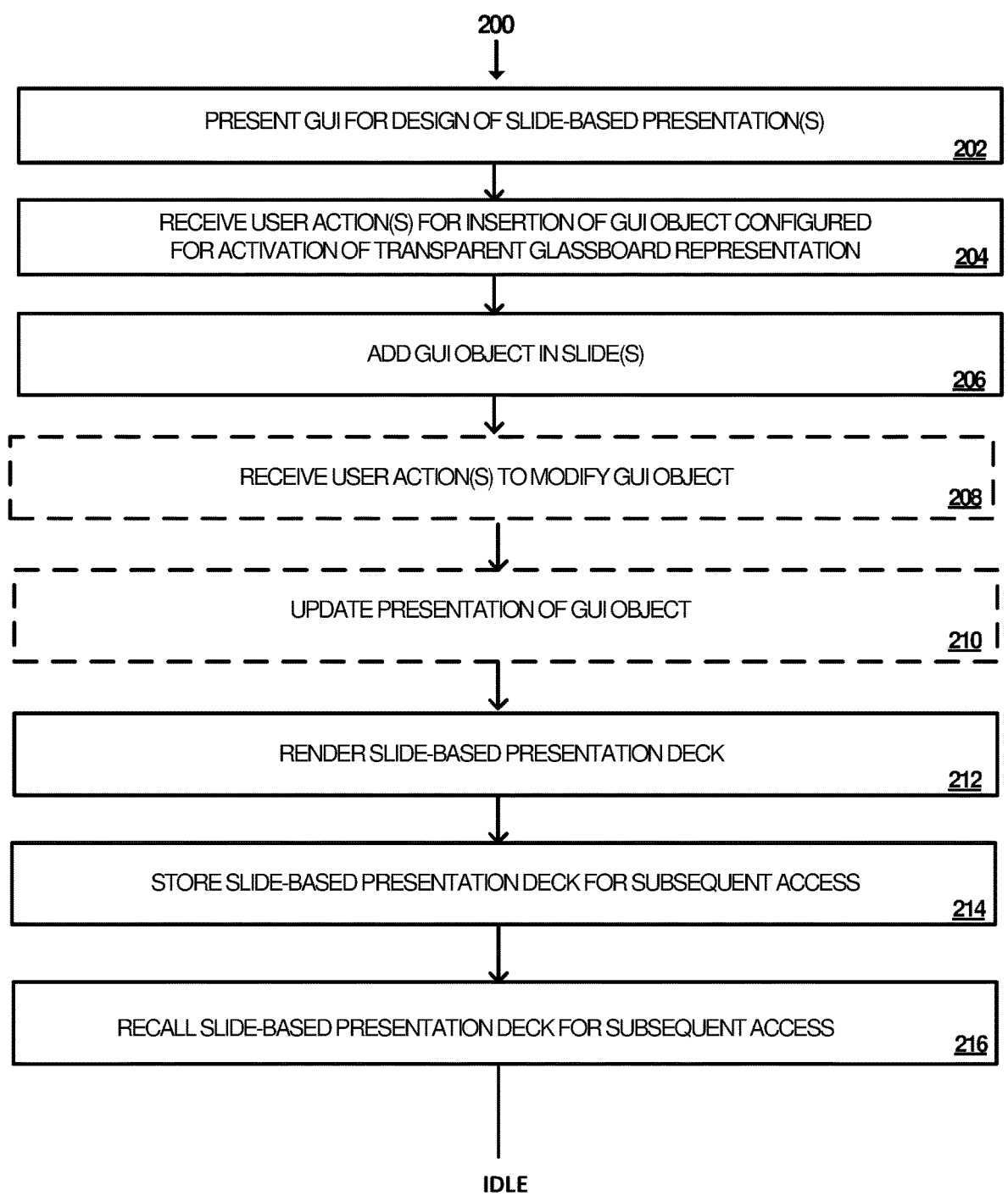

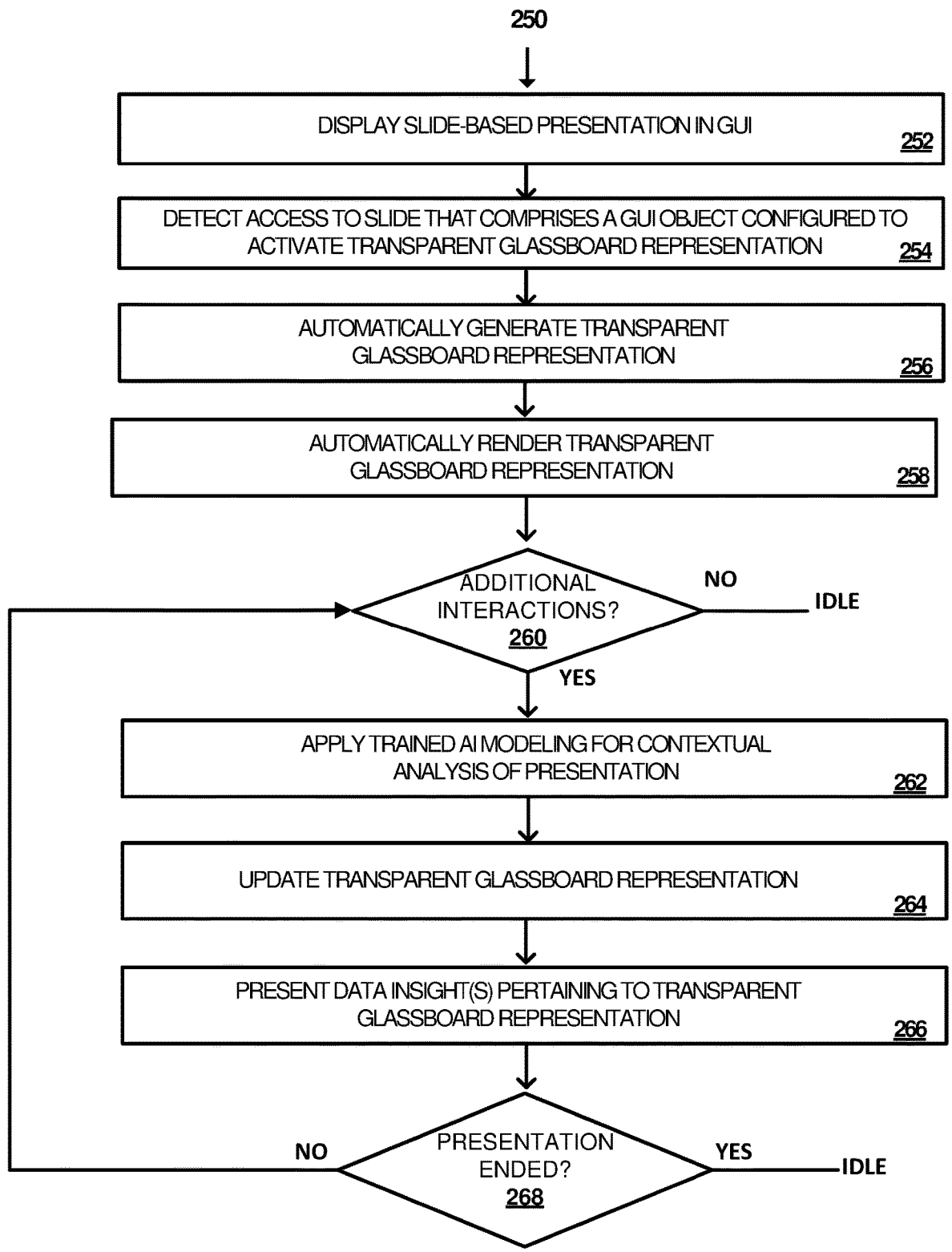

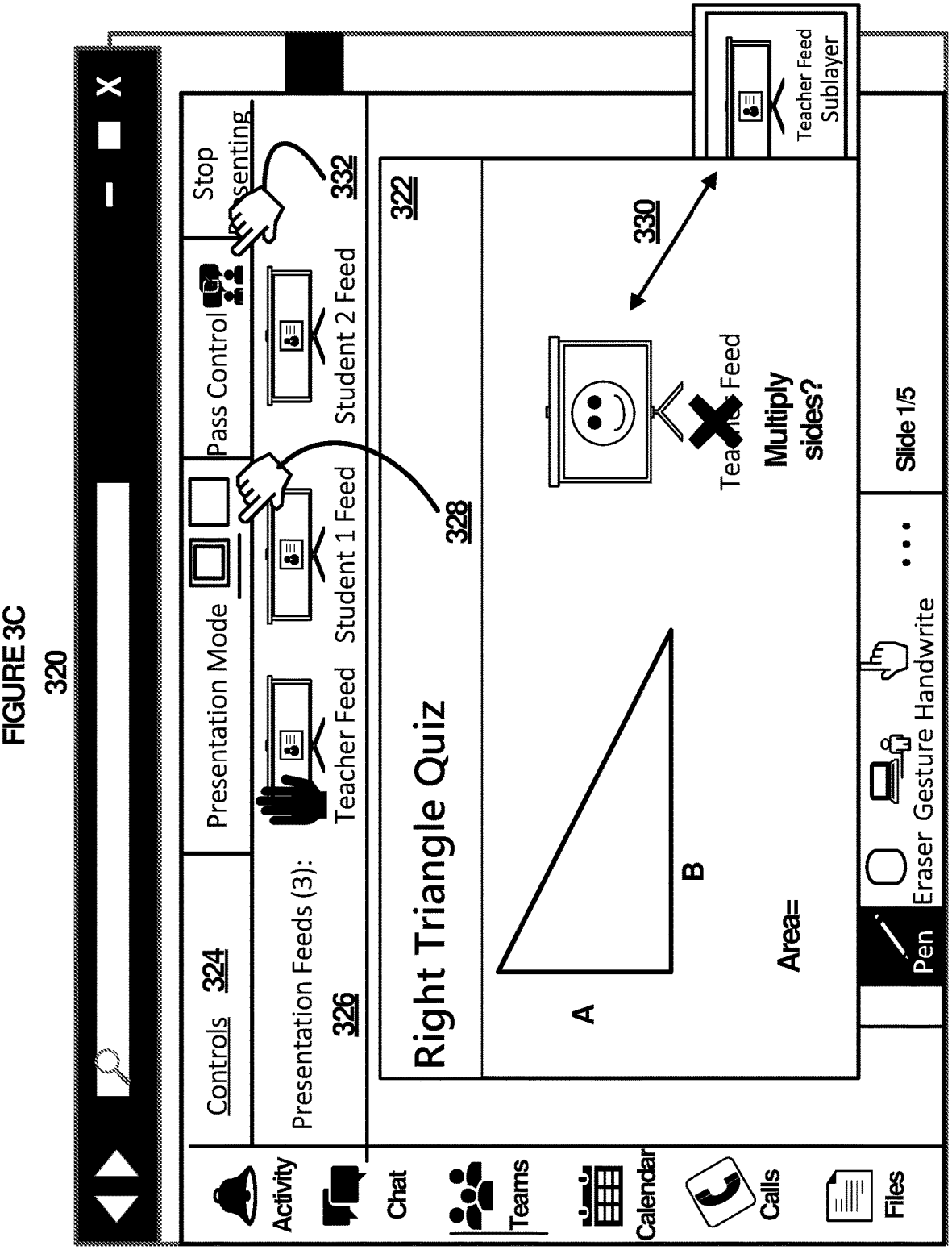

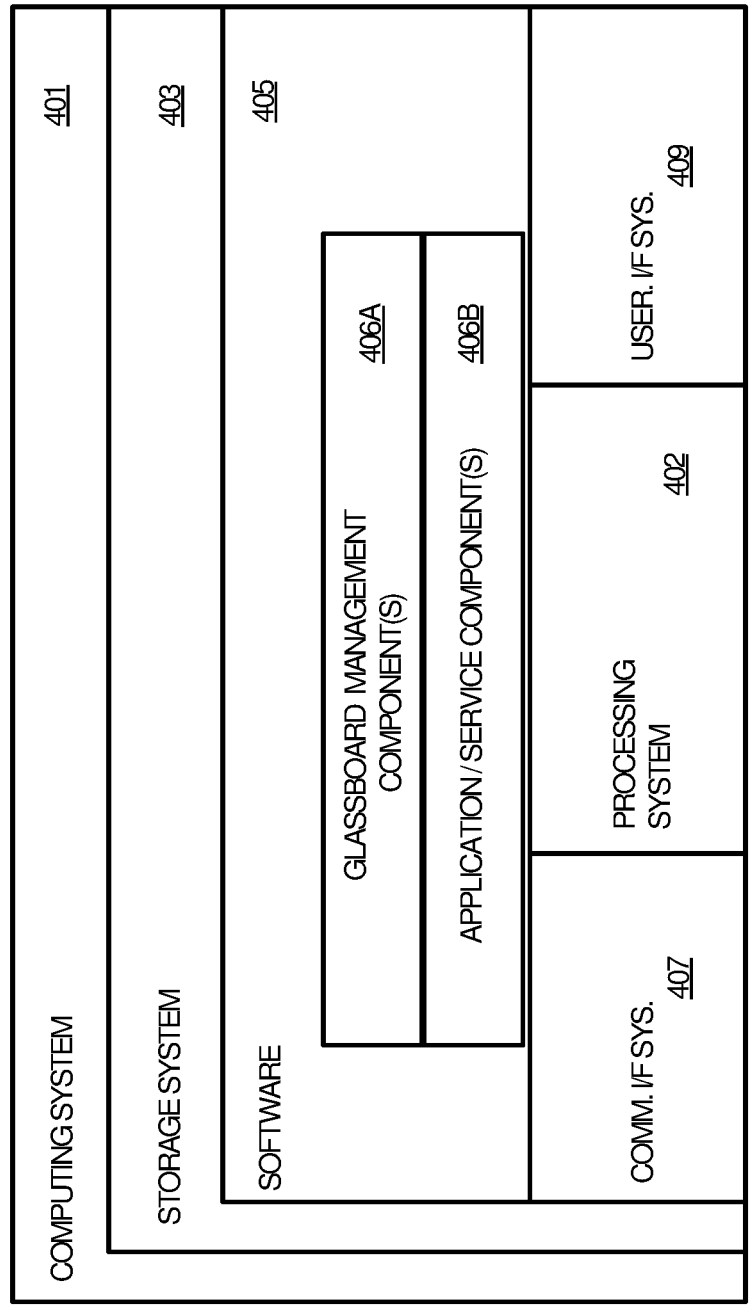

MANAGEMENT OF PRESENTATION CONTENT INCLUDING GENERATION AND RENDERING OF A TRANSPARENT GLASSBOARD REPRESENTATION

BACKGROUND

With the recent surge in remote electronic meetings, many users are finding that presentation of content is not delivered in the same manner as a physical meeting. This is especially troublesome in online learning experiences. Educators are finding that students are not as engaged with the content that is being presented. For instance, when a student is selected to answer a question/solve a problem, a video feed of the student is managed separate from the presented content. This presents a technical challenge where other users are required to follow not only the video feed of the responding student but also the video feed of the teacher as well as one or more windows of content. From a technical standpoint, any supplement content (e.g., the student's work) that is presented further adds separate layer of content to follow and is not easily combined with existing presentation content thereby making a presentation less integrated and also harder to follow for users. While educational experiences are described for ease of explanation, similar challenges exist with users presenting content to other users in personal and professional settings.

When additional content, such as notes/notations, is to be added to presentation content traditional applications/services try to solve this by providing content add-ons. One traditional add-on is a digital blackboard (or whiteboard) that provides a virtual representation of a blackboard (or whiteboard). However, applications/services providing digital blackboards provide a digital blackboard representation as a virtual camera add-on. Current technical examples where digital blackboards are rendered within presentations do not truly integrate the digital blackboard with existing content of the presentation or camera feeds that are presented therewith. This is extremely inefficient from a processing standpoint as multiple applications/services are required to be executed during a presentation, where those applications/services are required to stitch content together to poorly make the content appear as combined. As such, there is a technical need for an improved single application/service experience for presentation of content.

Yet another technical challenge pertains to the usage of digital blackboards with presentation content. In addition to being a virtual camera add-on and not seamlessly integrated with other presentation content, digital blackboards (or whiteboards) are not virtually presented or layered in a transparent manner. From a technical standpoint, this limits the ability of applications/services to layer content (e.g., underlay and overlay) relative to a digital blackboard. This technical challenge is typically why digital blackboards are presented as virtual camera add-ons with respect to other presentation content.

SUMMARY

For resolution of the above technical problems and other reasons, there is a technical need for the present disclosure that relates to management of transparent glassboard representations, where a virtual glassboard is comprehensively integrated with presentation content to efficiently bring the presentation content to life and maximize productivity during presentation experiences. An exemplary transparent glassboard representation provides a layered configuration of content layers in an ordered arrangement to maximize integration of a virtual glassboard within presentation content. As an example, layers of a transparent glassboard representation comprise but are not limited to: a camera feed layer; a transparent glassboard layer; an inking layer; and an augmented content layer. Video feeds can be overlaid by other content layers, where a virtual glassboard provides a visual appearance of integration of content layers that can be updated interactively as presentation content changes.

Some examples of the present disclosure comprise those where a graphical user interface (GUI) object is managed during the design of presentation content. The GUI object is configured to activate a transparent glassboard representation of presentation content, where a user can modify the GUI object during the design of presentation content. In further examples, the present disclosure pertains to management for rendering of a transparent glassboard representation within a GUI of a host application/service endpoint during real-time (or near real-time) presentation. Further non-limiting examples apply trained artificial intelligence (AI) processing to efficiency automate management of transparent glassboard representations both in the design phase of presentation content as well as the presentation phase. It is further to be recognized that the present disclosure also describes technical examples where representations of presentation content, comprising a transparent glassboard representation, may be synchronized through a plurality of different host applications/services (and associated endpoints). For instance, a collaborative framework is implemented to dynamically manage data associated with a representation of presentation content, and further synchronize any updates with other representations of the presentation content which are either embedded in other host application/service endpoints or are the original source content (e.g., an electronic document, file, digital canvas) in which the presentation content is created.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2A illustrates an exemplary method related to design of presentation content including incorporation of a GUI object associated with a transparent glassboard representation, with which aspects of the present disclosure may be practiced.

FIG. 2B illustrates an exemplary method related to management over rendering of a transparent glassboard representation during a presentation, with which aspects of the present disclosure may be practiced.

FIGS. 3A-3F illustrate exemplary processing device views associated with user interface examples for an improved user interface that is configured enable management over transparent glassboard representations of presentation content, with which aspects of the present disclosure may be practiced.

FIG. 4 illustrates a computing system suitable for implementing processing operations described herein related to management over transparent glassboard representations of presentation content, with which aspects of the present disclosure may be practiced.

DETAILED DESCRIPTION

Figure 1A:
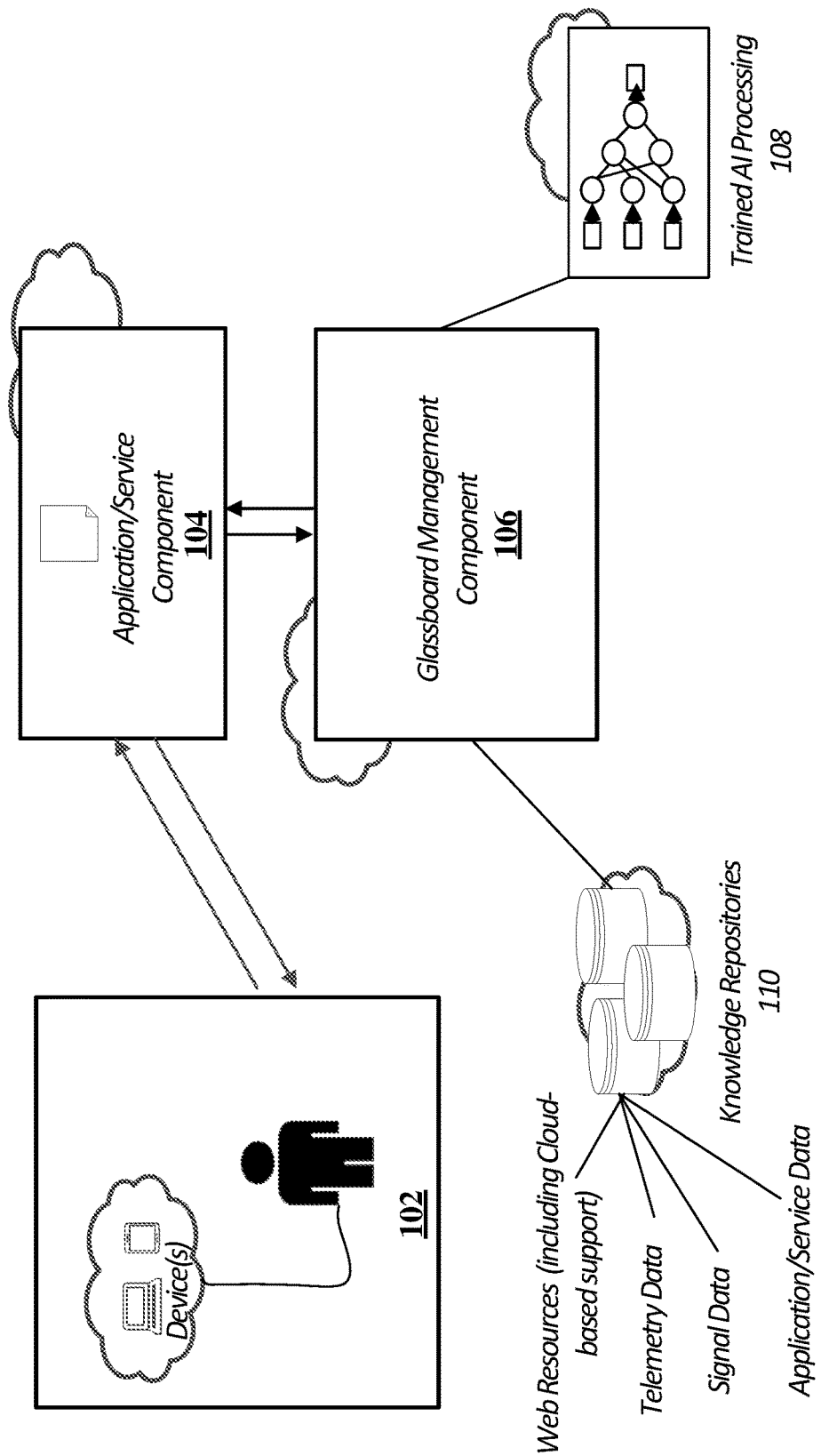
FIG. 1A illustrates an exemplary system diagram of components interfacing to enable management of a transparent glassboard representation relative to presentation content, with which aspects of the present disclosure may be practiced.

For resolution of the above technical problems and other reasons, there is a technical need for the present disclosure that relates to management of transparent glassboard representations, where a virtual glassboard is comprehensively integrated with presentation content to efficiently bring the presentation content to life and maximize productivity during presentation experiences. An exemplary transparent glassboard representation provides a layered configuration of content layers in an ordered arrangement to maximize integration of a virtual glassboard within presentation content. As an example, layers of a transparent glassboard representation comprise but are not limited to: a camera feed layer; a transparent glassboard layer; an inking layer; and an augmented content layer. Video feeds can be overlaid by other content layers, where a virtual glassboard provides a visual appearance of integration of content layers that can be updated interactively as presentation content changes. A virtual glassboard of the present disclosure is intended to cover technical instances where a content presentation layer is rendered transparent in a GUI of an application/service. For comparison, a virtual glassboard is rendered fully transparent as compared to a digital blackboard or digital whiteboard.

Some examples of the present disclosure comprise those where a GUI object is managed during the design of presentation content (i.e., a design phase). In a design phase, the present disclosure enables users to add a GUI object to presentation content, where the GUI object is configured to activate a transparent glassboard representation of the presentation content in which the GUI object is included. Presentation content is any type of digital content that is intended to be disseminated (or distributed) to one or more users. A non-limiting example of presentation content is slide-based presentation content (e.g., a slide and/or slide-based presentation deck). For ease of explanation, the present disclosure may reference slide-based presentation content, where a slide template and/or a slide (displayed slide) are described as states of presentation content. As such, some examples of presentation content comprise digital content that is pre-generated prior to dissemination/distribution. For example, content of a slide is integrated as a virtual glassboard that can further be modified while enabling a user to still view a base layer of digital content (e.g., original content). In other examples, a transparent glassboard representation is provided ad hoc, where content can be added to the transparent glassboard representation in real-time (or near real-time) without having an underlaying layer of original content.

In further examples, the present disclosure pertains to management for rendering of a transparent glassboard representation within a graphical user interface (GUI) of a host application/service endpoint. Such technical instances are referenced in the present disclosure as a presentation phase. For instance, a transparent glassboard representation of content is rendered in real-time (or near real-time) to aid user interaction with content. Among other technical benefits, the present disclosure aids digital learning and/or other digital meetings by providing a one click solution to integrate a virtual glassboard with presentation content. Enabling integration of a virtual glassboard with presentation content increases user attention, interaction and further provides an engaging holistic experience when content is being presented to users. Additionally, live feeds (e.g., live camera feeds) are incorporated in a transparent glassboard representation, thereby integrating live feeds, presentation content (e.g., content of a displayed slide) and further enabling user interaction that manages the addition/removal of new content to the transparent glassboard representation.

As referenced in the foregoing description, a layering configuration of a transparent glassboard representation is established. A layering configuration of content layers provides an ordered arrangement, where layers of a transparent glassboard representation comprise but are not limited to: a camera feed layer; a transparent glassboard layer; an inking layer; and an augmented content layer. A non-limiting example of a layering configuration is presented in FIG. 1B. A camera feed layer configured to present one or more camera feeds of users during a presentation is presented. The camera feed layer underlays other layers of the layering configuration essentially providing, at rendering, one or more camera feeds underlaying other content presented via a virtual glassboard. A transparent glassboard layer is then presented which directly overlays the camera feed layer, where the transparent glassboard layer presents a virtual glassboard integrating presentation content (e.g., content of a slide/slide template). The transparent glassboard layer presents a virtual glassboard providing a transparent representation of a slide including original content of a slide template associated with the slide. Moreover, an inking layer is presented that directly overlays the transparent glassboard layer, and further overlays any original content (e.g., of a slide template as added in a design phase of presentation content) and the camera feed layer. The inking layer is configured to manage interaction of new written content within the presentation content (e.g., when the presentation content is presented in real-time). Written content (or new written content) pertains to written content, including handwritten content, provided by: a user via a user appendage (e.g., finger) or a device (e.g., mouse, digital pen, stylus); typed content (e.g., received via a computing device); and content that is transcribed (e.g., via receipt and processing of an audio signal). As such, new written content is intended to distinguish from original content that was included in presentation content during a design phase. An exemplary layering configuration is further comprehensive in that it additionally comprises an augmented content layer. The augmented content layer directly overlays the inking layer and further overlays the transparent glassboard layer, the original content and the camera feed layer. The augmented content layer is configured to manage an interaction of new digital content, different from the original content and the new written content, with the presentation content (e.g., a displayed slide). The new digital content is addable to the slide during the presentation of the slide in the presentation mode. Non-limiting examples of new digital content comprise but are not limited to: text; images; videos; links; emojis; symbols; AR/VR content; posts; and audio files; among other examples.

Moreover, the present disclosure further discloses the application of trained artificial intelligence (AI) processing to enhance processing described herein including the automatic execution of processing operations to integrate a transparent glassboard representation into the design of presentation content as well as to enhance real-time (or near real-time) rendering of a transparent glassboard representation (e.g., integrated with presentation content). In one example, the present disclosure applies a trained AI model that is adapted to generate a representation of a GUI object, associated with activation of a transparent glassboard representation, for inclusion in the design of presentation content. For instance, a trained AI model may automatically determine how to integrate a GUI object into the layout of a slide template/slide-based presentation template that comprises content portions of presentation content. In doing so, a contextual analysis of data and/or metadata of a slide template is executed and used to determine how to automatically insert an exemplary GUI object within the slide template. In other examples, the present disclosure applies a trained AI model to real-time rendering of a transparent glassboard representation, for example, in a presentation (e.g., electronic presentation, electronic meeting).

In additional examples, a trained AI model is adapted to enhance the manipulation of content presented in one or more layers of a transparent glassboard representation during a real-time (or near real-time) presentation. For example, a contextual analysis of a presentation, including signal data received during the presentation, is executed. One or more layers of a transparent glassboard representation may be automatically modified based on a result of the contextual analysis of the presentation. Content portions in one or more layers may be modified in size, formatting, transparency, added/removed, etc., automatically. Moreover, a contextual analysis of a presentation also detects the receipt of gestures or user actions during a presentation, which can be processed to automatically update one or more layers of a transparent glassboard representation and/or control over a presentation. For instance, a user may execute a gesture action signaling to pass control of a presentation over to another user. A trained AI model is adapted to detect a gesture and generate a determination that a user intends to pass control of a presentation to another user. A transparent glassboard representation is updated automatically based on a result of a contextual analysis of a presentation.

It is further to be recognized that the present disclosure further describes technical examples where representations of presentation content, comprising a transparent glassboard representation, may be synchronized through a plurality of different host applications/services (and associated endpoints). An exemplary collaborative framework is implemented to dynamically manage data associated with a representation of presentation content, and further synchronize any updates with other representations of the presentation content which are either embedded in other host application/service endpoints or are the original source content (e.g., an electronic document, file, digital canvas) in which the presentation content is created. An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of presentation content (e.g., slide-based presentation deck) is included in an electronic meeting hosted through a collaborative communication application/service). During an instance of the electronic meeting, users may update content of a displayed slide that comprises a transparent glassboard representation. In such examples, the open-source collaborative framework is utilized to manage states of representations of that presentation content (e.g., via data mappings) across a plurality of host applications/services (and associated endpoints). If a representation of the presentation content is embedded inline within other host applications/services, said representations are automatically updated to provide a synchronized rendering of the transparent glassboard representation of presentation content. Inline, as referenced in the present disclosure, is intended to refer to technical instances where data is embedded as a content portion (data object), among other content portions, that is displayable within a rendering of a GUI of a host application/service endpoint.

Exemplary technical advantages provided by processing described in the present disclosure comprise but are not limited to: generation of GUI objects configured to active transparent glassboard representations of presentation content (e.g., slide template/displayed slide); ability to generate novel representations of camera feeds (e.g., live camera feeds) including editing a live camera feed to tailor a live camera feed for an exemplary transparent glassboard representation; novel layering configuration to integrate a virtual glassboard into presentation content; ability to create content interactions between exemplary GUI objects and other content portions of presentation content (e.g., displayed slide); ability to include multiple different content types into a transparent glassboard representation and manage states of content relative to one another in real-time (near real-time) presentation; application of trained AI processing to improve creation of presentation content including automatic adaption of an exemplary GUI object into a template for presentation content as well as automatic modification of content layers (of a transparent glassboard representation) during real-time (or near real-time) presentation; application of trained AI processing to improve rendering of camera feeds (e.g., creation of edited lie camera feeds) within presentation content; application of trained AI processing to dynamically evaluate a presentation and provide suggestions (e.g., data insight suggestions) for management of presentation content relative to a transparent glassboard representation; automatic activation of a transparent glassboard representation within presentation content during a live presentation; ability to store and recall presentation content that includes transparent glassboard representations; an improved GUI provided through an application or service that is configured to manage states associated with transparent glassboard representations; improved processing efficiency (e.g., reduction in processing cycles, saving resources/bandwidth) for computing devices when integrating transparent glassboard representations within presentation content; reduction in latency when activating transparent glassboard representations within presentation content; and interoperability to enable components described herein to interface with any type of application/service and any type of presentation content (e.g., different types of digital documents), among other technical advantages.

FIG. 1A illustrates an exemplary system diagram 100 of components interfacing to enable management of a transparent glassboard representation relative to presentation content, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in methods 200 (FIG. 2A) and 250 (FIG. 2B) as well as processing described in and associated with visual diagrams of FIGS. 3A-3F and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a glassboard management component 106; a component for implementation of trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that is executing an application or service configured to enable generation of presentation content and/or conducting of a presentation of presentation content. In one example, a user may be utilizing a presentation application or service to create/design presentation content or even execute a presentation of presentation content (e.g., in a trial/rehearsal run or as a live presentation). In another example, a user may be conducting an electronic meeting through a collaborative communication application or service, where a GUI is provided for the electronic meeting including a GUI window enabling a user to present presentation content (e.g., displayed using a presentation application or service) within a GUI of a collaborative communication application or service. In further examples, real-time presentation of a slide-based presentation deck may occur in a presentation mode of a presentation application/service. Presentation content is any type of digital content that is intended to be disseminated (or distributed) to one or more users. A non-limiting example of presentation content is slide-based presentation content (e.g., a slide and/or slide-based presentation deck). For ease of explanation, the present disclosure may reference slide-based presentation content, where a slide template and/or a slide (displayed slide) are described as states of presentation content. As such, some examples of presentation content comprise digital content that is pre-generated prior to dissemination/distribution. For example, content of a slide is integrated as a virtual glassboard that can further be modified while enabling a user to still view a base layer of digital content (e.g., original content). In other examples, a transparent glassboard representation is provided ad hoc, where content can be added to the transparent glassboard representation in real-time (or near real-time) without having an underlaying layer of original content. Presentation content may further comprise any electronic document (or electronic file). An electronic document is a representation of authored content in an electronic media/electronic format such as a digital file. Examples of electronic documents may vary, where files may be created to work with any type of application/service and in any type of file format as known to one skilled in the field of art. For instance, an electronic document may be created for: a presentation application or service (e.g., slide-based presentation application or service such as POWERPOINT®); a collaborative communication application or service (e.g., MICROSOFT® TEAMS®); a word processing application or service, a notetaking application or service; a spreadsheet application or service; an illustration (or diagramming) application or service; and a web application or service, among other examples. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. Electronic documents may also include message content examples such as email messages, instant text messages and social media postings, images, audio files, and videos, among other examples.

Furthermore, user computing device(s) 102 may be specifically configured to enable users to provide camera feeds (e.g., live camera feeds) during a presentation of presentation content. User computing device(s) 102 may comprise components such as a video camera (e.g., webcam) and a microphone, which may be utilized to establish a camera feed through an application or service. As referenced in the foregoing, a live camera feed as described herein is intended to cover any example where one or more content streams, including a video stream, are presented over an electronic medium. For example, a live camera feed covers technical instances where one or more data streams (e.g., including a live video stream) are broadcast (e.g., over a network connection) and/or provided as output through a computing device and/or computer program. An exemplary live camera feed is intended to distinguish from technical instances where video is recreated from static images, where the latter would require significant technical modification, above what is traditionally known, to integrate a feed into a slide-based presentation in the manner described in the present disclosure. For instance, processing of static images would limit the ability to apply content interactions between exemplary GUI objects and other slide content making resulting interactions not appear seamless on the front-end (i.e., GUI) and ultimately be less efficient from a processing standpoint on the back-end. In some examples, a live camera feed of present disclosure also processes additional data types (e.g., audio data) as a stream (e.g., audio stream) to cohesively represent a presentation state of a user and/or computing device. Processing for rendering and presenting live streams and types of data streams that may be included in a live camera feed are known to one skilled in the field of art.

Above what is traditionally, known the present disclosure describes novel processing for working with live camera feeds including ways in which they are integrated within presentation content (e.g., a slide-based presentation). Further improvements over traditional systems are reflected through contextual analysis of presentation content and adaptation of camera feeds for presentation content. An exemplary camera feed (e.g., live camera feed) is made part of the presentation content (e.g., a slide of a slide-based presentation), where the user can edit a GUI object for the live camera feed as it would other types of content objects of a slide-based presentation. For example, a novel GUI object, configured to activate a transparent glassboard representation of the presentation content in which the GUI object is included, is editable where users can directly apply thereto any of: object formatting options, modification of layouts and styles, animations, etc., as well as modify the GUI object to assign specific user accounts and/or computing devices as a subject of the live camera feed. A GUI object of the present disclosure is utilized to automatically activate a transparent glassboard representation, including renderings of one or more camera feeds from any users (e.g., presenters, audience members) and/or any devices (e.g., different computing devices of presenters providing different content), within a representation of presentation content. An exemplary transparent glassboard representation provides a layered configuration of content layers in an ordered arrangement to maximize integration of a virtual glassboard within presentation content. As an example, layers of a transparent glassboard representation comprise but are not limited to: a camera feed layer; a transparent glassboard layer; an inking layer; and an augmented content layer. Video feeds can be overlaid by other content layers, where a virtual glassboard provides a visual appearance of integration of content layers that can be updated interactively as presentation content changes. A virtual glassboard of the present disclosure is intended to cover technical instances where a content presentation layer is rendered transparent in a GUI of an application/service. For comparison, a virtual glassboard is rendered fully transparent as compared to a digital blackboard or digital whiteboard. Moreover, the present disclosure allows multiple live camera feeds from different presenters to appear on the same slide and/or on different slides in a slide-based presentation deck. It is further to be recognized that processing described herein related to generation of a transparent glassboard representation enables the presentation of multiple virtual glassboards rendered for the same presentation content (e.g., same slide template and/or displayed slide). For instance, in design phase, where presentation content is designed, a user can associate multiple virtual glassboards with a slide template through incorporation of multiple exemplary GUI objects within a slide template. For instance, a teacher may assign a complex math equation for a student to solve that requires more room to show work. In another technical instance, a teacher may wish to have more than one student concurrently working on the same math equation and have virtual glassboards respectively associated with each individual student. In other examples, a ratio of virtual glassboards to slide templates (e.g., 1:1) may be maintained to improve processing efficiency at the time of rendering of a transparent glassboard representation.

An application/service component 104 may be configured to establish a transparent glassboard representation through interfacing with one or more of: a user computing device 102; a glassboard management component 106; a component for implementation of trained AI processing 108; and knowledge repositories 110. For example, a collaborative communication application or service, that is used to establish an electronic meeting, may detect components (e.g., webcam and microphone) of a user computing device 102 and automatically establish a connection thereto to enable a transparent glassboard representation be presented for presentation content of an electronic meeting. Further, the glassboard management component 106 is configured to interface with the application/service component 104 to identify streams associated with live camera feeds of participants in a presentation such as a user communication. A user communication is a technical instance where at least one user is involved in a conversation. Examples of user communications are known to one skilled in the field of art. For reference, some technical instances of user communications comprise collaborative communications between multiple users such as electronic meetings or a conversation over an electronic medium (e.g., messaging, email, channel of a collaborative application/service). Additional examples of user communications may also extend to instances where a user is conducting a conversation with a software application/service (e.g., one that provides a chatbot) that simulates dialogue of a conversation or other examples where one or more users are providing dialogue such as a training run of a presentation being recorded through a presentation application/service or the like. It is to be recognized that one or more live camera feeds are then rendered within a camera feed layer of an exemplary layering configuration for rendering of a transparent glassboard representation. During conducting of a presentation, through a host application/service endpoint, it is to be recognized that users are also provided with functionality to control the presentation of camera feeds (e.g., live camera feeds) that are presented within a transparent glassboard representation.

An exemplary application/service component 104 is further configured to manage data associated with host applications/services and associated endpoints. As previously referenced, the application/service component 104 interfaces with other computer components of system diagram 100 to enable management of presentation of a transparent glassboard representation (e.g., inline with content of a specific host application/service endpoint). An application/service component 104 further manages presentation of a GUI usable to manage user interactions with a transparent glassboard representation. A host application/service configured to enable execution of tasks by one or more user accounts. Non-limiting examples of host applications/services that are applicable in the present disclosure comprise but are not limited to: open-source collaborative framework applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/services; social networking applications/services; educational learning applications/services; and suites of applications/services that may collectively comprise a combination of one or more of the previously mentioned applications/services, among other examples. The application/service component 104 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

The application/service component 104 is further configured to present, through interfacing with other computer components of system diagram 100, an adapted GUI that provides user notifications, GUI menus, GUI elements, etc., to manage rendering of transparent glassboard representations and automatic notifications thereof. For instance, a GUI of a host application/service configured for management of a transparent glassboard representation and presentation of synchronized updates to the same received through any representations rendered inline within other host application/services (and associated endpoints). This may include automatic update of components through GUI features/elements that are presented without a user having to take manual action to request. In other instances, an application command control (e.g., user interface ribbon and/or GUI menus) may be adapted to include selectable user interface features related to management of a transparent glassboard representation. For instance, GUI elements may be automatically generated and presented that enable users to toggle between a traditional representation of presentation content and a transparent glassboard representation. Non-limiting visual examples of an improved GUI, and GUI elements provided therein, are provided in FIGS. 3A-3F.

As identified above, the application/service component 104 is configured to provide data for user access to an application/service including provision of a GUI for user access to an application/service. For instance, the application/service component 104 is configured to render and provide a GUI of an application/service by which users can manage presentation content. Management of presentation content comprises any instance of: creating/designing presentation content; editing presentation content; storing/recalling presentation content; and inclusion of presentation content during conducting of a presentation including transparent glassboard representations, among other examples. The application/service component 104 interfaces with the user computing device(s) 102 to enable provision of an exemplary GUI through the user computing device(s) 102 or display devices connected therewith. Through a GUI of an application or service, management of transparent glassboard representations can be provided through any type of GUI element including but not limited to: digital documents; GUI callouts; banners; notifications; messages; and GUI menus and windows, among other examples. Non-limiting examples of GUI representations associated with the present disclosure are illustrated in FIGS. 3A-3F, and further described in that accompanying description.

Host applications/services (and associated endpoints), provided by the application/service component 104, may interface with other components of system diagram 100 to enhance processing efficiency and functionality as described herein. The application/service component 104 is configured to interface with a user computing device(s) 102 as well as the glassboard management component 106, the component for implementation of trained AI processing 108 and knowledge repositories 110 (e.g., of a distributed software platform). In doing so, contextual signal data may be collected and analyzed to enhance processing described herein including contextual evaluations of presentation content a state of a presentation (including a state of a transparent glassboard representation). Moreover, contextual signal data may be further analyzed to aid with determinations executed by one or more trained AI models. Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services including data (and metadata) associated with specific presentation content. Application-specific signal data may comprise not only current signal data instances, but also past usage of an application or service by one or more users. As an example, signal data may pertain to interactions received relative to a transparent glassboard representation that is provided during a presentation of presentation content. For instance, users may interact with: features of a host application/service during presentation of a transparent glassboard representation; interactions with presentation content presented via the transparent glassboard representation; audio signals and/or messages received during presentation of a transparent glassboard representation; and interactions received via camera feeds presented concurrent with the transparent glassboard representation, among other examples. In some alternative examples where a traditional representation of presentation content is displayed, signal data may also be analyzed to determine whether a user intends to convert the presentation content to a transparent glassboard representation, thereby toggling between presentation modes.

It is further to be recognized that the application/service component 104 is also configured to manage representations of presentation content, comprising a transparent glassboard representation, which may be synchronized through a plurality of different host applications/services (and associated endpoints). An exemplary collaborative framework is implemented to dynamically manage data associated with a representation of presentation content, and further synchronize any updates with other representations of the presentation content which are either embedded in other host application/service endpoints or are the original source content (e.g., an electronic document, file, digital canvas) in which the presentation content is created. An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of presentation content (e.g., slide-based presentation deck) is included in an electronic meeting hosted through a collaborative communication application/service). During an instance of the electronic meeting, users may update content of a displayed slide that comprises a transparent glassboard representation. In such examples, the open-source collaborative framework is utilized to manage states of representations of that presentation content (e.g., via data mappings) across a plurality of host applications/services (and associated endpoints). If a representation of the presentation content is embedded inline within other host applications/services, said representations are automatically updated to provide a synchronized rendering of the transparent glassboard representation of presentation content. Inline, as referenced in the present disclosure, is intended to refer to technical instances where data is embedded as a content portion (data object), among other content portions, that is displayable within a rendering of a GUI of a host application/service endpoint.

In addition to managing data storages related to content of a distributed collaborative canvas, the application/service component 104, through interfacing with the glassboard management component 106, a component for implementation of trained AI processing 108 and/or knowledge repositories 110, is adapted to manage mappings of representations of presentation content to a transparent glassboard representation. For lookup purposes to maintain correlation amongst different representations of presentation content, mappings are created correlate representations of presentation content to a transparent glassboard representation. For instance, data associated with presentation content comprise but are not limited: an identification of the presentation content (ID); markers indicating positioning/location of a component (e.g., start/end range of content); identification of content types and/or positioning/formatting of content (e.g., lines, rows, columns, sizing); timestamp data related to creation and management of presentation content and/or representations thereof; and user account access relative to content, among other examples. Other data that may be stored as part of an exemplary data mapping may comprise but is not limited to: data/metadata indicating user accounts associated with presentation content; data/metadata indicating content updates to presentation content and indications of user accounts that performed respective updates; data indicating message notifications pertaining to presentation content; data/metadata indicating mapping between representations of presentation content; and data/metadata indicating comments, tasks, reminders, etc., associated with a presentation content, among other examples. Any of the previously mentioned examples may be included in an individual or collective dating mapping, where a data mapping can be used to aid contextual analysis for providing synchronization update to a representation of presentation content. The application/service component 104 may interface with other components of system diagram 100 to enable querying of data mappings which can aid processing determinations for providing synchronization updates. Furthermore, a programmed software module and/or trained AI processing may be adapted to obtain and utilize any of the above identified data pertaining to a data mapping (individually or in combination) to aid relevance processing for determining how to generate a representation of presentation content including rendering of a transparent glassboard representation. A trained AI model (e.g., machine learning model) may be trained to correlate data associated with a data mapping with user context data (e.g., including user activity current or past user activity and/or user preferences) to automatically generate determinations that aid contextually relevant notification generation. Additionally, exemplary knowledge repositories 110, as subsequently described, may store data needed to execute any processing operations described herein, including data mappings generated by the application/service component 104.

As previously referenced, trained AI processing (e.g., one or more trained AI models) is applied to execute a contextual analysis of a presentation, including signal data received during the presentation. This may comprise signal data received through user gestures, analysis of user speech, content added (e.g., via an inking layer and/or an augmented content layer) by users during the presentation. Analyzing of signal data, including user-specific signal data, occurs in compliance with user privacy regulations and policies. For instance, users may consent to monitoring of signal data to improve user experience and operation of applications/services associated with a software data platform. Through execution of trained AI processing, automatic determinations may be generated to automatically to manage a state of a transparent glassboard representation of presentation content. One or more layers of a transparent glassboard representation may be automatically modified based on a result of the contextual analysis of the presentation (e.g., a state of a presentation as determined from evaluation of any type of signal data during real-time (near real-time) presentation of presentation content). Content portions in one or more layers may be modified in size, formatting, transparency, added/removed, etc., automatically.

Moreover, a contextual analysis of a presentation also detects the receipt of gestures or user actions during a presentation, which can be processed to automatically update one or more layers of a transparent glassboard representation and/or control over a presentation. For instance, a user may execute a gesture action signaling to pass control of a presentation over to another user. A trained AI model is adapted to detect a gesture and generate a determination that a user intends to pass control of a presentation to another user. A transparent glassboard representation is updated automatically based on a result of a contextual analysis of a presentation. As an example, one or more types of signal data described herein may be utilized to generate determinations as to a contextual state of a presentation (including a rendered transparent glassboard representation). For instance, signal data may be analyzed to determine past presentation content associated with a user and past user accounts that contributed to the past presentation content. Such contextual data can be used to generate data insight suggestions or effect automatic updates to content portions/content interactions. In further examples, similar presentation content from other user accounts may be identified that is related to presentation content included in a specific presentation (e.g., a slide-based presentation deck). Such contextual data may also be used to generate data insight suggestions or effect automatic updates to content portions/content interactions. In further examples, analysis of signal data may comprise identifying correlations and relationships between the different types of signal data, where telemetric analysis may be applied to generate the above identified contextual determinations (including timing determinations). Captured signal data and results of telemetric analysis thereof may be stored or subsequent retrieval via the knowledge repositories 110. It is further noted that any stored (or logged) data is retained in compliance with data privacy laws and regulations.

In even further examples, relevance scoring/ranking processing is generated by a trained AI model to generate determinations pertaining to evaluation of a context of a presentation including a state of a transparent glassboard representation and whether the same should be automatically updated. Developers may set a weighting as to specific types of signal data that contribute to relevance scoring to determine whether to automatically update a transparent glassboard representation. In further technical instances, thresholds may be set by developers for generated relevance scoring that indicate whether or not to automatically apply a generated determination to effect an update to a transparent glassboard representation.

The glassboard management component 106 is one or more components configured for management of transparent glassboard representations, where a virtual glassboard is comprehensively integrated with presentation content to efficiently bring the presentation content to life and maximize productivity during presentation experiences. In doing so, the glassboard management component 106 is configured to execute processing operations that occur in either the design phase of presentation content and/or the presentation phase. Some examples of the present disclosure comprise those where a GUI object is managed during the design of presentation content (i.e., a design phase). In a design phase, the present disclosure enables users to add a GUI object to presentation content, where the GUI object is configured to activate a transparent glassboard representation of the presentation content in which the GUI object is included. In further examples, the present disclosure pertains to management for rendering of a transparent glassboard representation within a graphical user interface (GUI) of a host application/service endpoint. Such technical instances are referenced in the present disclosure as a presentation phase. For instance, a transparent glassboard representation of content is rendered in real-time (or near real-time) to aid user interaction with content. Among other technical benefits, the present disclosure aids digital learning and/or other digital meetings by providing a one click solution to integrate a virtual glassboard with presentation content. Enabling integration of a virtual glassboard with presentation content increases user attention, interaction and further provides an engaging holistic experience when content is being presented to users. Additionally, live feeds (e.g., live camera feeds) are incorporated in a transparent glassboard representation, thereby integrating live feeds, presentation content (e.g., content of a displayed slide) and further enabling user interaction that manages the addition/removal of new content to the transparent glassboard representation. Examples of processing operations executed by the presentation feed management component 106 (and/or interaction with the component for implementation of trained AI processing 108), comprise but are not limited to processing operations described in present disclosure including system diagram 100 (FIG. 1A), diagram 150 (FIG. 1B), method 200 (FIG. 2A), method 250 (FIG. 2B) and those described in the description of FIGS. 3A-3F. For readability of the present disclosure, those processing operations are not explicitly restated in the description of glassboard management component 106 but are understood to be executed thereby.

The glassboard management component 106 may further be configured to manage application of trained AI processing including building, training, and application of trained AI models (e.g., implemented as trained AI processing provided through component 108). In some technical instances, trained AI processing may be applied that is configured to automatically aid processing in either a design phase of presentation content and/or a presentation phase of presentation content. Trained AI processing 108 may comprise implementation of one or more trained AI models. Implementation of trained AI modeling including creating, adapting, training, and updating of a component for implementation of AI processing 108 is known to one skilled in the field of art. Trained AI processing may be applicable to aid any type of determinative or predictive processing including specific processing operations described about with respect to determinations, classification ranking/scoring and relevance ranking/scoring. This may occur via any of supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, trained AI processing may be continuously updated over time including based on receipt of user feedback regarding representations of provided through an improved GUI of an application or service.

Knowledge repositories 110 may be accessed to obtain data for generation, training and implementation of trained AI processing as well the operation of processing operations by that of the application/service component 104 and the glassboard management component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the presentation feed management component 106 and/or the trained AI processing.

Knowledge repositories 110 may be data stored on a distributed data storage that is accessible over a network connection. However, in some examples, data described with respect to knowledge repositories 110 may be stored locally on a computing device. Examples of data maintained by knowledge repositories 110 comprises but is not limited to: collected signal data (e.g., from usage of an application/ service, device-specific, user-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored representations of data insight suggestions; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing and transcription processing including user context analysis to derive a current context of a user communication (e.g., evaluation of user speech, written content and/or gestures). The cloud-assistance service may provide the glassboard management component 106 and/or application/service component 104 with access to larger and more robust library of stored data for execution of language understanding/natural language understanding processing including transcribing audio signals received from users/participants, optical recognition processing and/or gesture evaluation (including intent of a gesture). Access to the cloud-assistance service may be provided when an application/service is accessing content in a distributed service-based example (e.g., a user is utilizing a network connection to access an application/service), as the data of the cloud-assistance service may be too large to store locally. In further examples, the glassboard management component 106 may be configurable to interface with a web search service, entity relationship databases, etc., to extend a corpus of data to make the most informed decisions when generating determinations related to contextual analysis of context of a presentation including a transparent glassboard representation. In further examples, telemetry data may be collected, aggregated and correlated (e.g., by an interfacing application/service) to further provide components of system diagram 100 with on-demand access to telemetry data which can aid determinations generated thereby including generation of data insights and application automatic updates to a transparent glassboard representation.

Figure 1B:
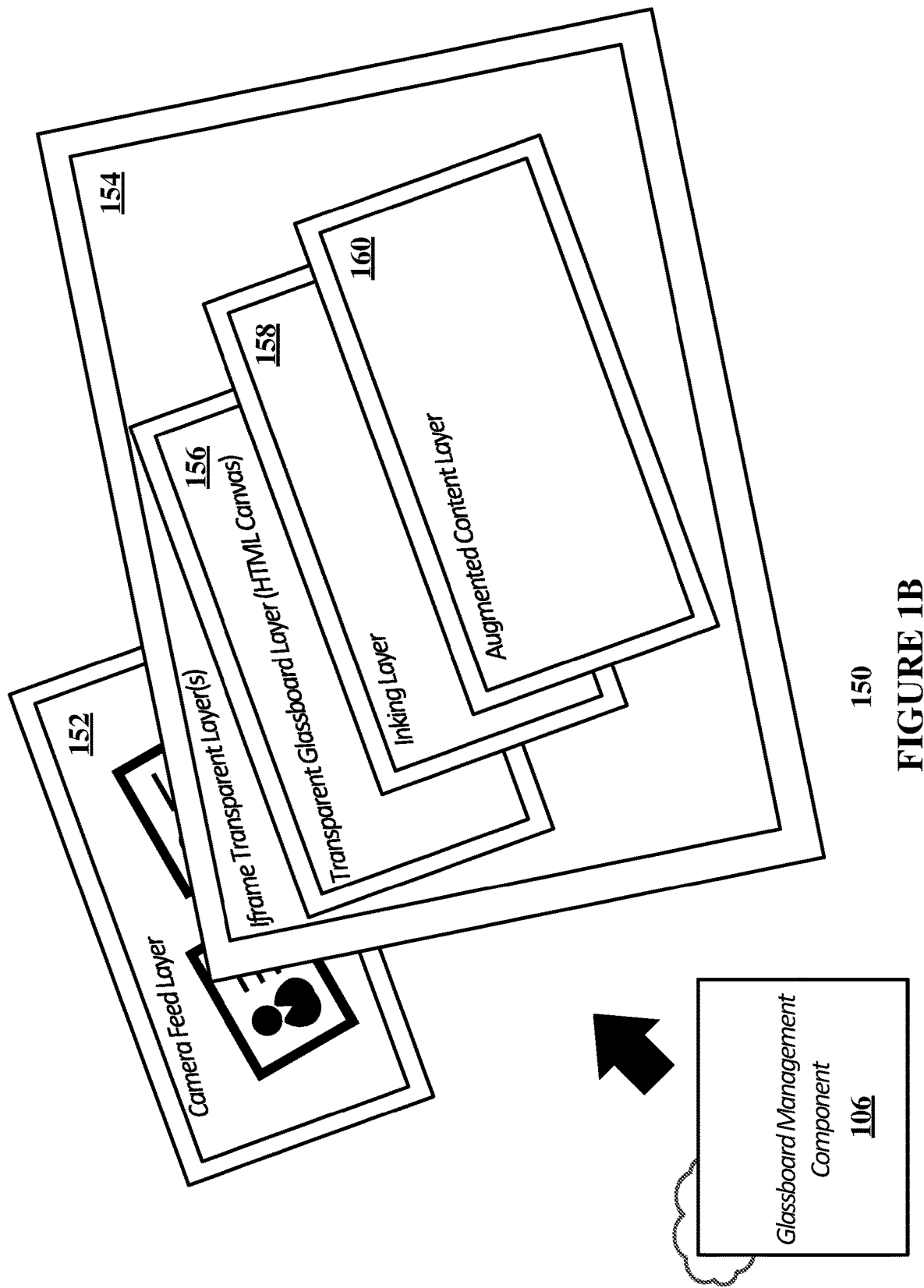
FIG. 1B illustrates an exemplary diagram of an exemplary layering configuration established for a transparent glassboard representation of presentation content, with which aspects of the present disclosure may be practiced.

FIG. 1B illustrates an exemplary diagram 150 of an exemplary layering configuration established for a transparent glassboard representation of presentation content, with which aspects of the present disclosure may be practiced. It is to be recognized that layering configuration illustrated in diagram 150 is one non-limiting example of an ordered arrangement of layers, where an ordering of content layers described herein can vary without departing from the spirit of the present disclosure. In one alternative example, a camera feed layer, presenting one or more camera feeds, may be configured as an overlaying layer that overlays one or more other content layers (e.g., transparent glassboard layer) of an exemplary layering configuration that presents original content (original presentation content). In further technical instances, it is to be recognized that different types of content may be managed within a single content layer. For instance, an inking layer and an augmented content layer may be the same content layer, where any type of new content (that is not original content of a displayed slide) would be rendered concurrently in the same content layer. This helps distinguish content that is newly added to a displayed slide as compared with original content that was originally added to a slide template during a design phase of presentation content and may further locked from editing. The layering configuration, presented in diagram 150, is generated by an exemplary glassboard management component 106 described in FIG. 1A. A layering configuration of content layers provides an ordered arrangement, where layers of a transparent glassboard representation comprise but are not limited to a camera feed layer 152; and a grouping of iframe transparent layers 154 that comprise: a transparent glassboard layer 154; an inking layer 156; and an augmented content layer 158.

A camera feed layer 152 is configured to present one or more camera feeds (e.g., live camera feeds) during a presentation of presentation content. The camera feed layer 152 underlays other layers of the layering configuration essentially providing, at rendering, one or more camera feeds underlaying other content presented via a virtual glassboard. During a design phase of presentation content, an adapted GUI may is configured to enable users to assign a specific camera feed (e.g., live camera feed) to an exemplary GUI object. For instance, a user account, ID, or designation of a type of camera feed (e.g., presenter 1, presenter 2, audience) may be modified relative to a GUI object that is inserted in presentation content (e.g., a slide template). During a presentation phase, one or more camera feeds are rendered in the camera feed layer 152 as a sublayer of the layering configuration. This may result in rendered camera feeds visually appearing, during rendering of a transparent glassboard representation, underlaying other content layers. To enable a camera feed to be visually integrated with other content layers and appear as seamless, processing operations are executed to generate a modified camera feed. Non-limiting examples of such processing operations comprise: detecting an, original camera feed (e.g., unedited live camera feed of during a presentation of the presentation content; removing a background associated with the original camera feed; generating a modified camera feed for the original camera feed based on the removing of the background; and inserting the modified camera feed as content into the camera feed layer. In some examples, modification of a camera feed may also comprise adding a background effect (e.g., color, blur, etc.) to provide a level of contrast between a camera feed and a virtual glassboard representation of presentation content (e.g., a slide with a transparent background).

Furthermore, overlaying the camera feed layer 152, are a plurality of iframe transparent layers 154. The iframe transparent layers 152 are configured to render one or more portions of presentation content transparent so that other content layers (e.g., camera feed layer 152) can appear as integrated. As understood by one skilled in the field of art, an iframe is an inline frame used inside a webpage to load other HTML documents inside of the frame. Above what is traditionally known, the iframe transparent layers 152 of the present disclosure are utilized to load presentation content (e.g., content of slide template/displayed slide) and additional content layers relative to an exemplary GUI object, configured to activate a transparent glassboard representation, presented within presentation content (e.g., slide template/displayed slide). Doing so manages presentation content and additional content layers (e.g., inking layer and augmented content layer) in an integrated and transparent manner within a host application/service endpoint, where the iframe transparent layers 152 each overlay the camera feed layer 152.

A first layer of the iframe transparent layers 152 is the transparent glassboard layer 154, which is presented directly overlaying the camera feed layer 152. The transparent glassboard layer 154 presents a virtual glassboard as an HTML canvas that comprises original content (e.g., of presentation content) and further enables additional content to be added thereon including those where written content and/or augmented content can be added on top of. As indicated in the foregoing description, original content is any content that is added to the presentation content (e.g., a slide template) in a design phase of presentation content. As such, the transparent glassboard layer 154 presents a virtual glassboard providing a transparent representation of a slide including original content of a slide template associated with the slide. Importantly, the transparent glassboard layer 154 is generated relative to a position and location of one or more GUI objects, configured to activate a transparent glassboard representation, within presentation content (e.g., a slide template). As such, the transparent glassboard layer 154 utilizes the metes and bounds of the GUI (e.g., within a slide template), to determine the metes and bounds of the virtual glassboard in a rendering (e.g., displayed slide) of the presentation content (e.g., slide template). Among other processing operations, rendering of a virtual glassboard, from an exemplary GUI in presentation content, comprises: identifying bounds of the GUI object configured to activate the transparent glassboard representation within the presentation content; generating the virtual glassboard for the slide by rendering transparent pixels of the slide that are associated with the bounds of the GUI object; and inserting the virtual glassboard as content into transparent glassboard layer for rendering during the transparent glassboard representation. As such, one or more portions of presentation content may be rendered transparent based on the positioning of one or more GUI objects within presentation.

In alternative examples a transparent glassboard representation is dynamically rendered in real-time (or near real-time) where a GUI object was not previously incorporated into a design (e.g., a design phase) of presentation content. In one such example, an adapted GUI may be configured to enable to place a GUI object, representative of a transparent glassboard representation, over presentation content. In another technical example where a GUI object was not previously incorporated into a design of presentation content, an entirety of presentation content (e.g., an entire slide) may automatically be rendered as transparent similar to if a GUI object was designed to encompass the entirety of the presentation content. In any example, a trained AI model may be adapted and applied to automatically render a transparent glassboard representation. In technical instances where a transparent glassboard representation is rendered dynamically, a trained AI model may contextually analyze presentation content, including content types, layouts, formatting, etc., and generate determinations as to how to render a virtual glassboard. In some technical instances, this may comprise following applying pre-determined rules for formatting a virtual glassboard (e.g., based on presentation content type and/or positioning of content thereof). In other technical instances, relevance scoring/ranking analysis is applied evaluating contextual data (data and metadata) of presentation content and even exemplary signal data associated with a context of a presentation to generate relevance scoring as to how to render a virtual glassboard relative to presentation content. For example, a determination may be generated, based on results of said relevance scoring/ranking analysis, to render one or more portions of presentation content (e.g., a quarter slide, half slide, full slide) as a virtual glassboard.

Moreover, an inking layer 158 is presented that directly overlays the transparent glassboard layer 156, including any original content (e.g., of a slide template), and the camera feed layer 152. The inking layer 158 is configured to manage interaction of new written content within the presentation content (e.g., when the presentation content is presented in real-time). Written content (or new written content) pertains to written content, including handwritten content, provided by: a user via a user appendage (e.g., finger) or a device (e.g., mouse, digital pen, stylus); typed content (e.g., received via a computing device); and content that is transcribed (e.g., via receipt and processing of an audio signal). For instance, during a presentation of presentation content, users may add written content to transparent portions of a rendering of the presentation content (e.g., displayed slide) that is presented as part of the transparent glassboard representation. As such, new written content is intended to distinguish from original content that was included in presentation content during a design phase.

An exemplary layering configuration is further comprehensive in that it additionally comprises an augmented content layer 160. The augmented content 160 layer directly overlays the inking layer 158 and further overlays the transparent glassboard layer 156, including original content, and the camera feed layer 152. The augmented content layer 160 is configured to manage an interaction of new digital content, different from the original content and the new written content, with the presentation content (e.g., a displayed slide). The new digital content is addable to the slide during the presentation of the slide in the presentation mode. Non-limiting examples of new digital content comprise but are not limited to: images; videos; links; emojis; symbols; AR/VR content; posts; and audio files; among other examples. As such, new digital content is coined as a term to differentiate from new written content that is added as written content. As previously referenced, some alternative examples of a layering configuration may treat any type of new content (e.g., new written content and new digital content) within a single content layer and thus not require both an inking layer 158 and an augmented content layer 160.

FIG. 2A illustrates an exemplary method 200 related to design of presentation content including incorporation of a GUI object associated with a transparent glassboard representation, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A) and diagram 150 (FIG. 1B). Processing operations performed in method 200 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 200 may be executed by a component such as the glassboard management component 106 (of FIG. 1A) and/or the component for implementation of the trained AI processing 108 (FIG. 1A). In distributed examples, processing operations described in method 200 may be implemented by one or more computer components connected over a distributed network. For example, computer components may be executed on one or more network-enabled computing devices, connected over a distributed network, that enable access to user communications. It is further to be recognized that an order of execution of processing operations in method 200 may vary without departing from the spirit of the present disclosure. Furthermore, variations of method 200 may be comprise execution of one or more of the processing operations identified in method 200 even omitting some of the processing operations depending on a device and/or system that is executing processing.

Method 200 begins at processing operation 202, where a GUI, of a presentation application or service is presented enabling users to create/design presentation content. As indicated in the foregoing, presentation content has been previously defined. Presentation content is intended to cover any example where one or more content portions are inserted and arranged within a digital document or electronic file for presentation purposes. It is to be recognized that utility of the present disclosure extends to working with any type of electronic files or digital documents in which a live feed may be configurable as an inserted or embedded content portion. Types of electronic files and digital documents are known to one skilled in the field of art. As non-limiting examples, digital documents comprise but are not limited to: word processing documents; spreadsheet documents; notes documents; webpages; presentation documents (e.g., presentation slide, open canvas template); illustration documents (e.g., artboards, flowcharts, drawing documents); recording/editing documents (e.g., video or audio); messaging/email documents; and social networking objects (e.g., posts). For ease of explanation, reference is made to slide-based content as presentation content. Slide-based content is intended to cover any example (e.g. linear or nonlinear) where one or more content portions are inserted and arranged within one or more templatized canvases, which are viewable as (or convertible to) a presentation document. In one example, slide-based content is a linear representation (e.g., presentation slide provided through a presentation application/service such as POWERPOINT®). For example, a transparent glassboard representation is generated for a slide of a slide-based presentation. Another example of slide-based content is a nonlinear representation where an open canvas template is provided and manipulated (e.g., via zooming) to present content portions thereof. For example, a portion of an open canvas template can be zoomed-in on to provide a fractional representation of the open canvas template.

As an example of presentation content, a user may launch a presentation application or service that is configured to manage (e.g., create or modify) slide-based content such as a slide-based presentation deck. A slide-based presentation deck is a grouping of a plurality of presentation slides that collectively represent presentation content as a version of slide-based content. In some examples, presentation slides (or hereafter "slides") of a slide-based presentation deck may have the same presentation theme. An exemplary presentation theme is a collective set of visual style attributes that are applied to the slides of the slide-based presentation deck. Non-limiting examples of visual style attributes of a presentation theme comprise but are not limited to: predefining layout attributes (e.g., grouping and/or layering of objects); colors scheme (including color scheme for a background of a slide); fonts (e.g., color, type, size); and visual effects, among other examples. A presentation theme thereby provides a presentation with a unified and harmonious appearance while minimizing the processing effort required to do so when creating a presentation through a GUI.

In processing operation 202, a user may utilize the GUI of the presentation application or service to create (or modify) a slide-based presentation deck that comprises one or more slide templates representative of displayed slides at presentation. The GUI of the presentation application or service may be improved over traditional GUIs by providing GUI elements that are specifically directed to the management of GUI objects configured for activation of a transparent glassboard representation. Activation of a transparent glassboard representation for presentation content occurs during real-time (or near real-time) presentation of presentation content. This may occur when presentation content is included in a presentation mode rather than a design mode (e.g., working with slide templates to create/arrange a slide-based presentation deck). For example, an improved GUI may be configured to present GUI elements that enable users to easily add, remove, modify, etc., GUI objects to one or more slides of a slide-based presentation deck. Non-limiting examples of GUI elements related to management of GUI objects of the present disclosure are presented in FIGS. 3A-3F and further described in the accompanying description thereof.

During presentation of a slide-based presentation deck (or slide-based templates thereof), an exemplary GUI object is configured to automatically activate the transparent glassboard representation which establishes an exemplary layering configuration of content layers to create a virtual glassboard rendering of presentation content. In a design phase where a user is creating a slide-based presentation deck, the GUI object may be an editable placeholder for a virtual glassboard. One or more GUI objects can be added to slide of a slide-based presentation (slide-based presentation deck), where a virtual glassboard can be automatically incorporated into any slide content of slide-based presentation deck through addition of exemplary GUI objects to a slide-based template (slide template). As previously referenced, exemplary GUI objects are editable including size, positioning, layout and associations (e.g., associating one or more camera feeds with a GUI object). In one example, a user can assign a specific camera feed (e.g., live camera feed) for rendering in a transparent glassboard representation.

Presentation of a slide-based presentation deck may occur through the GUI of the presentation application or service or within a GUI of a different application or service. For example, a user may present a slide-based presentation deck via a GUI window of a collaborative communication service that is utilized to conduct an electronic meeting. In some technical instances, this may occur through interfacing between a presentation application or service and a collaborative communication application or service (e.g., by the application/service component 104 of FIG. 1A), where a representation of a GUI of the presentation application or service may be presented in a GUI window of the communication collaborative application or service during conducting of an electronic meeting. In other technical instances, users may exclusively utilize a presentation application or service to present a slide-based presentation deck (or slide-based templates thereof). For example, this may occur during creation/design of a slide-based presentation deck, within a presentation mode of a presentation application or service, and/or in a mode that enables recording of a presentation of a slide-based presentation deck (e.g., a trial or rehearsal presentation or during a presentation to one or more other users).

Flow of method 200 may proceed to processing operation 204, where a first user action may be received through a GUI of a presentation application/service. For example, the first user action is an action to insert a GUI object, configured to activate a transparent glassboard representation, within a slide template of a slide-based presentation deck. In one example, processing operation 204 may comprise a user selecting a GUI element from an application command control menu provided through a GUI of a presentation application or service. For instance, a GUI menu of a GUI may be adapted to provide explicit GUI elements that are used to manage a state of a GUI object of the present disclosure. The user may execute an action that selects a GUI element, from the GUI menu, and places a GUI object within a slide template of a slide-based presentation deck. In one example, this may be a compound action such as a click-and-drag action that selects a representation of a GUI object from a GUI menu and drags that representation to a specific position within a slide template. In another example, a user may simply provide input through a series of device actions (e.g., mouse or stylus selection of GUI menu features) to automatically insert a GUI object within a slide-based template. In some technical examples, a selection of a GUI element configured for insertion of a GUI object, from an application command control, triggers automatic display of GUI menu that enables a user to select a predetermined configuration for a size of a GUI object relative to presentation content.

A size/format of GUI object, within a slide representation (e.g., slide template), directly impacts how much of a displayed slide is rendered (during a presentation phase) as a transparent glassboard representation. As such, a GUI sub-menu may provide selectable GUI elements that enable a user to automatically insert and/or re-size/re-format a GUI object so that the user does not have to manually modify the GUI object upon insertion. Among other examples, GUI sub-menu enables a user to resize a GUI object, relative to a size of a slide template to one of: a quarter of the size of the slide template (quarter slide); half of the size of the slide template (half slide); and full size of the slide template (full slide).

In response to receiving the first user action, flow of method 200 may proceed to processing operation 206, where an exemplary GUI object is automatically added to the slide template (or a slide) of a slide-based presentation deck. As referenced in the foregoing, the GUI object may be automatically added to a slide-based template at a specific location selected by a user or at a random location (e.g., determined relative to other content portions of a slide-based template). In some examples, a trained AI model is applied to automatically determine a location, size and/or format of a GUI object within the slide template. This processing may automatically occur based on determinations generated from contextual analysis of presentation content as previously described. In any example, an addition of the GUI object to the slide template adds the GUI object as an editable content portion within the slide template. The automatically applying of the trained AI model comprises: determining an initial positioning of the GUI object and an initial formatting of the GUI object within the slide template based on a result of the analysis of the one or more of data and the metadata for the slide-based template. In some further technical instances, associations (e.g., one or more camera feeds) with a GUI object may be automatically determined and assigned to a GUI object. Furthermore, the automatic application of trained AI processing further comprises automatically inserting the GUI object into the slide-based template based on a result of the determining of the initial positioning and the initial formatting of the GUI object. In some instances, the trained AI model is further adapted to automatically modify a transparency of one or more content portions of the original content based on the determining of the initial positioning of the GUI object and the initial formatting of the GUI object and/or other aspects of contextual analysis described herein. For example, transparency of different content portions and/or content layers may be automatically modified based on a result of contextual analysis of a presentation when rendering a transparent glassboard representation.

Adding of the GUI object to the slide template automatically creates a layering configuration that provides an ordered arrangement of content layers to create the transparent glassboard representation in a rendering of the slide-based presentation deck. The layering configuration comprises: a camera feed layer, underlaying other layers of the layering configuration, that presents a camera feed within the displayed slide. The layering configuration further comprises a transparent glassboard layer, overlaying the camera feed layer, that presents a virtual glassboard providing a transparent representation of a slide including original content of a slide template associated with the slide. Furthermore, the layering configuration further comprises: an inking layer that directly overlays the transparent glassboard layer and further overlays the original content and the camera feed layer. The inking layer is configured to manage interaction of new written content, different from the original content, with the displayed slide, Exemplary new written content is addable to the displayed slide during a presentation of the displayed slide in the presentation mode. Moreover, the layering configuration further comprises: an augmented content layer that directly overlays the inking layer and further overlays the transparent glassboard layer, including the original content, and the camera feed layer. The augmented content layer is configured to manage an interaction of new digital content, different from the original content and the new written content, with the displayed slide. Exemplary new digital content is addable to the displayed slide during the presentation of the displayed slide in the presentation mode.

Once a GUI object automatically appears within a slide-based template, the GUI can be further edited by the user. In some examples, a second user action (processing operation 208) is received that modifies one or more of: receiving a second user action that modifies, within the slide template, one or more of: positioning of the GUI object, formatting of the GUI object, and associations therewith (e.g., camera feeds/live camera feeds to be rendered in a transparent glassboard representation). Otherwise, a user can manually modify parameters associated with a GUI object. As previously referenced, a GUI menu/sub-menu may be rendered in a GUI enabling a user to select from predetermined sizes and/or formats for an exemplary GUI object, which can be selected at any time to modify the GUI object according to the predetermined parameters. In examples where a second user action is received, a presentation of the GUI object, within the GUI, is updated (processing operation 210) within the slide template in response to a receipt of the second user action.

Method 200 then proceeds to processing operation 212. At processing operation 212, a slide-based presentation deck is rendered. Rendering (processing operation 212) of the slide-based presentation deck automatically activates the GUI object to present the transparent glassboard representation within a displayed slide when the displayed slide, associated with the slide template, is presented in a presentation mode of the presentation application or service. As one example, a user may render a slide-based presentation deck in the design phase to test the integration of a transparent glassboard representation with presentation content. In some examples, this may occur before the user presents the presentation content, including a transparent glassboard representation, to other users.

Flow of method 200 proceeds to processing operation 214. At processing operation 214, a slide-based presentation deck is stored for subsequent recall. For instance, a user may store an electronic file associated with a slide-based presentation deck on a local data storage of a computing device and/or a distributed data storage. In some examples, storage of an electronic file on a distributed data storage may further comprise attaching the electronic file to content such as an email, message, web posting, electronic meeting invite, workspace of collaborative communication application/service, etc.

Method 200 then proceeds to processing operation 216. At processing operation 216, the slide-based presentation deck is recalled for subsequent access. This may comprise accessing an electronic file associated with the slide-based presentation deck.

FIG. 2B illustrates an exemplary method 250 related to management over rendering of a transparent glassboard representation during a presentation, with which aspects of the present disclosure may be practiced. For instance, method 250 may comprise processing operations that are executed after a slide-based presentation deck, previously created in a design phase of presentation content, is recalled (processing operation 216 of method 200) for subsequent access. Method 250 may be executed across an exemplary computing system 401 (or computing systems) as described in the description of FIG. 4. Exemplary components, described in method 250, may be hardware and/or software components, which are programmed to execute processing operations described herein. Non-limiting examples of components for operations of processing operations in method 250 are described in system diagram 100 (FIG. 1A) and diagram 150 (FIG. 1B). Processing operations performed in method 250 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 250 may be executed by a component such as the glassboard management component 106 (of FIG. 1A) and/or the component for implementation of the trained AI processing 108 (FIG. 1A). In distributed examples, processing operations described in method 250 may be implemented by one or more computer components connected over a distributed network. For example, computer components may be executed on one or more network-enabled computing devices, connected over a distributed network, that enable access to user communications. It is further to be recognized that an order of execution of processing operations in method 250 may vary without departing from the spirit of the present disclosure. Furthermore, variations of method 250 may be comprise execution of one or more of the processing operations identified in method 250 even omitting some of the processing operations depending on a device and/or system that is executing processing.

Method 250 begins at processing operation 252, where a slide-based presentation deck is displayed (or rendered) in a GUI of an application or service. In one example of processing operation 252, a slide-based presentation deck may be rendered in a GUI of a presentation application or service. In other examples, including those where other types of presentation content are being presented, a representation of presentation content may be rendered in a GUI window of another application/service such as a collaborative communication application or service that is used to execute a user communication such as an electronic meeting. For instance, a slide-based presentation deck may be presented in a GUI window of an application or service. It is to be recognized that presentation content may be rendered in any type of host application/service endpoint previously described in the present disclosure. Furthermore, multiple different representations of presentation content may be managed across host applications/services (and associated endpoints) of a software data platform. Representations of presentation content, comprising a transparent glassboard representation, may be synchronized through a plurality of different host applications/services (and associated endpoints) via interfacing with a collaborative framework. An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of presentation content (e.g., slide-based presentation deck) is included in an electronic meeting hosted through a collaborative communication application/service). During an instance of the electronic meeting, users may update content of a displayed slide that comprises a transparent glassboard representation. In such examples, the open-source collaborative framework is utilized to manage states of representations of that presentation content (e.g., via data mappings) across a plurality of host applications/services (and associated endpoints). If a representation of the presentation content is embedded inline within other host applications/services, said representations are automatically updated to provide a synchronized rendering of the transparent glassboard representation of presentation content. Inline, as referenced in the present disclosure, is intended to refer to technical instances where data is embedded as a content portion (data object), among other content portions, that is displayable within a rendering of a GUI of a host application/service endpoint.

During presentation of a slide-based presentation deck, flow of method 250 may proceed to processing operation 254. At processing operation 254, the presentation feed management component may be configured to detect access to a slide, of the slide-based presentation deck, that comprises, within the slide, a GUI object configured to activate one or more transparent glassboard representations. In some examples, this may comprise application of a trained AI model to dynamically render a transparent glassboard representation as previously described.

In response to detecting the access to the slide, the transparent glassboard representation of the slide is automatically generated (processing operation 256). Automatic generation (processing operation 256) of the transparent glassboard representation of the slide comprises: establishing a layering configuration that provides an ordered arrangement of content layers to create the transparent glassboard representation. Non-limiting examples of an ordered arrangement of content layers has been described in the foregoing description including the description of diagram 150 (FIG. 1B).

Moreover, automatic generation (processing operation 256) of the transparent glassboard representation further comprises: detecting an original camera feed associated with the presentation of the slide; removing a background associated with the original camera feed; generating a modified camera feed for the original camera feed based on the removing of the background; and inserting the modified camera feed as content into the camera feed layer. In additional examples, automatic generation of the transparent glassboard representation further comprises: identifying bounds of the GUI object configured to activate the transparent glassboard representation within the slide; generating the virtual glassboard for the slide by rendering transparent pixels of the slide that are associated with the bounds of the GUI object; and inserting the virtual glassboard as content into transparent glassboard layer.

The transparent glassboard representation is then automatically rendered (processing operation 258) in the GUI of the presentation application or service based on the layering configuration. Automatic rendering (processing operation 258) of the transparent glassboard representation may comprise converting a traditional representation of a displayed slide to a transparent glassboard representation by generating content layers of the transparent glassboard representation according to the exemplary layering configuration. In alternative examples, rendering of a transparent glassboard representation does not automatically occur and instead occurs based on a receipt of a manual user action received through a GUI of a host application/service endpoint. For instance, a GUI feature selection, associated with a GUI feature configured to enable presentation of the transparent glassboard representation of the slide during the presentation, is received. Following that example, the transparent glassboard representation is automatically generated/rendered based on a trigger of the receiving of the GUI selection of the GUI feature configured to enable presentation of the transparent glassboard representation.

Rendering (processing operation 258) of a transparent glassboard representation comprises rendering content of said transparent glassboard representation according to a layering configuration that comprises: a camera feed layer, underlaying other layers of the layering configuration, that presents a camera feed. The layering configuration further comprises a transparent glassboard layer that directly overlays the camera feed layer and presents a virtual glassboard providing a transparent representation of a slide including original content of a slide template associated with the slide. The transparent glassboard layer presents a virtual glassboard within the displayed slide. Furthermore, the layering configuration further comprises: an inking layer that directly overlays the transparent glassboard layer, including the original content, and the camera feed layer. The inking layer is configured to manage interaction of new written content, different from the original content, with the displayed slide. Exemplary new written content is addable to the displayed slide during a presentation of the displayed slide in the presentation mode. Moreover, the layering configuration further comprises: an augmented content layer that directly overlays the inking layer and further overlays the transparent glassboard layer, and the camera feed layer. The augmented content layer is configured to manage an interaction of new digital content, different from the original content and the new written content, with the displayed slide. Exemplary new digital content is addable to the displayed slide during the presentation of the displayed slide in the presentation mode.

Flow of method 250 then proceeds to decision operation 260. At decision operation 260, it is determined whether a user action (e.g., additional interactions) are received with respect to a rendering of a transparent glassboard representation (e.g., of a displayed slide). For instance, a user may interact with GUI features of a GUI and/or presentation content displayed in a GUI, which may result in an update to the transparent glassboard representation. In examples where no additional interactions are received with a transparent glassboard representation, flow of decision operation 260 branches "NO" and processing of method 250 remains idle until an interaction is received with presentation content and/or a new transparent glassboard representation is to be generated (e.g., for the displayed slide or a different displayed slide). In examples where a user interaction is received with respect to a rendering of a transparent glassboard representation, flow of decision operation 260 branches "YES" and method 250 proceeds to processing operation 262.

At processing operation 262, a trained AI model is applied to execute contextual analysis of a presentation relative to the transparent glassboard representation. Non-limiting examples of contextual analysis of a presentation, relative to the transparent glassboard representation, have been described in the foregoing description. For instance, one or more determinations may be generated, through application of a trained AI model, to automatically manipulate content presented in one or more layers of the transparent glassboard representation. For example, a computer-implemented method further comprises detection of a user gesture occurring during presentation of the transparent glassboard representation. In response to the receiving of the user gesture, a trained AI model is automatically applied, where the trained AI model is adapted to automatically manipulate content presented in one or more layers of the transparent glassboard representation based on a result of contextual analysis of the presentation. Non-limiting examples of modifications of presentation content, relative to a transparent glassboard representation, are illustrated in at least FIG. 3E.

Flow of method 250 then proceeds to processing operation 264. In response to automatic determinations generated from contextual analysis of a presentation, via application of a trained AI model, one or more layers of the transparent glassboard representation are automatically updated (processing operation 264). This comprises updating a GUI representation of the transparent glassboard representation in which users are conducting a presentation. Furthermore, processing operation 264 may further comprise determining if any additional representations of presentation content should be synchronized due to an update to the transparent glassboard representation. For instance, representations of presentation content may be associated with other host application/service endpoints. As referenced in the foregoing description, data mappings may be maintained and referenced to determine how to synchronize representations of presentation content across host applications/services and associated endpoints.

In some examples of method 250, a result of contextual analysis of a presentation by a trained AI model may result in the generation of data insight notifications for users associated with a presentation. In examples where data insights are generated for presentation, method 250 proceeds to processing operation 266. At processing operation 266 one or more data insight notifications are presented pertaining to the transparent glassboard representation. Data insight notifications can be presented (processing operation 266) to a user, via a GUI of a host application/service, to improve a user experience as well as subsequent processing efficiency of host applications/services and associated endpoints. A non-limiting example of a data insight notification is illustrated in FIG. 3F and further described in the accompanying description.

Flow of method 250 then proceeds to decision operation 268. At decision operation 268, it is determined whether the presentation of the presentation content has ended. In examples where the presentation continues, flow of decision operation 268 branches "YES" and method 250 returns to decision operation 260 for subsequent evaluation. In examples where it is determined that the presentation has ended, flow of decision operation 268 branches "NO" and processing of method 250 remains idle until subsequent presentation of the presentation content occurs.

FIGS. 3A-3F illustrate exemplary processing device views associated with user interface examples for an improved user interface that is configured enable management over transparent glassboard representations of presentation content, with which aspects of the present disclosure may be practiced. FIGS. 3A-3F provide non-limiting front-end examples of processing described in the foregoing including system diagram 100 (FIG. 1A), diagram 150 (FIG. 1B), method 200 (FIG. 2A) and method 250 (FIG. 2B).

Figure 3A:
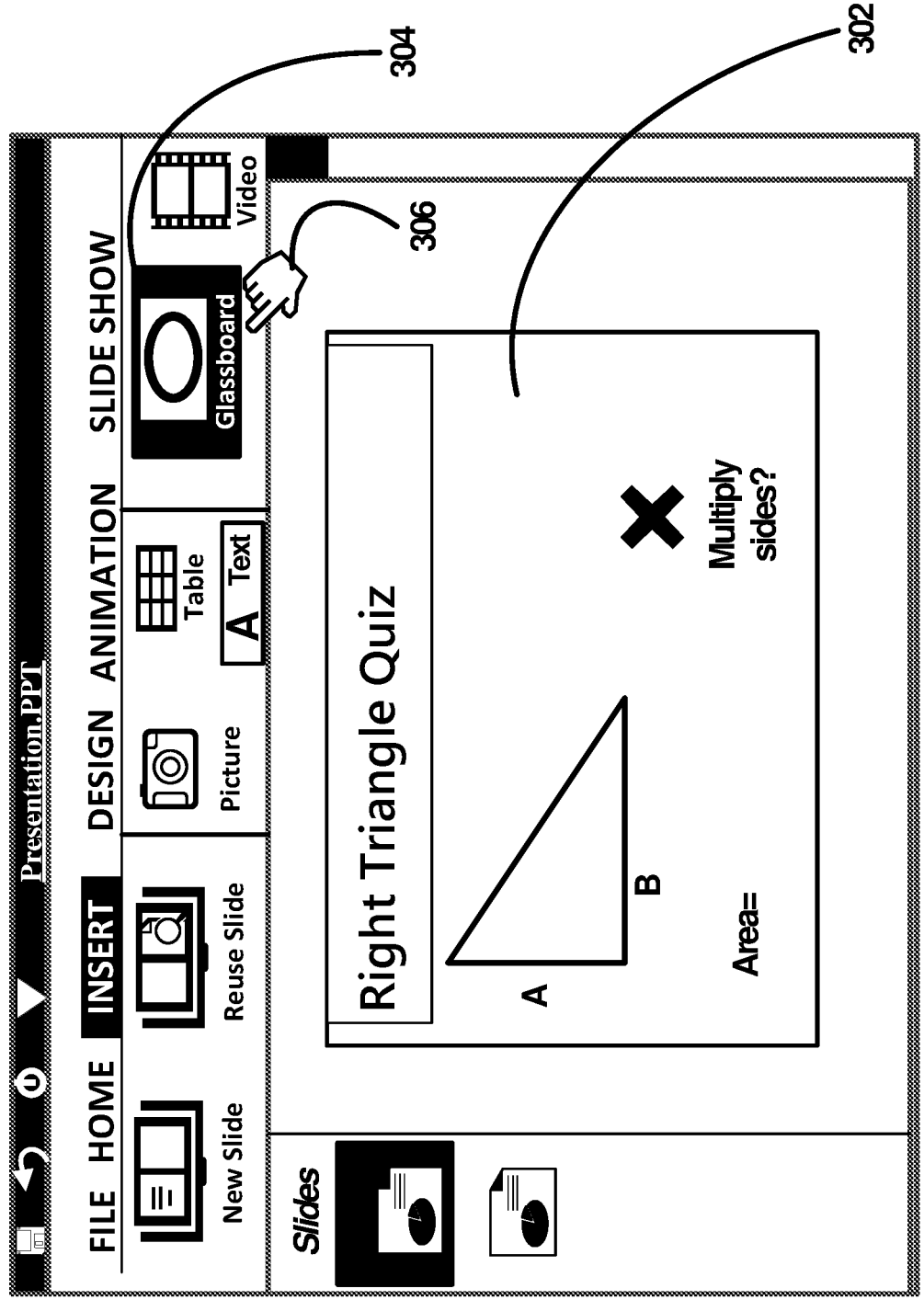

FIG. 3A presents processing device view 300, illustrating an improved GUI of a presentation application or service (e.g., POWERPOINT®) that is configured to manage presentation content. In the example shown in processing device view 300, a design phase of presentation content is being managed through a GUI. The GUI, of the presentation application or service, displays a slide representation 302 (e.g., slide template) illustrating a slide that is being created/designed. A user may edit content of the slide representation 302 including content provided therein and/or presentation themes associate with slides of a slide-based presentation deck.

Processing device view 300 further illustrates GUI features/elements that enable users to insert exemplary GUI objects of the presentation disclosure within the slide representation 302. For example, a GUI menu is presented in processing device 300 that is adapted to comprise a GUI menu feature 304 that is configured to enable addition of an exemplary GUI object within the slide representation 302. A GUI object is configured to activate a transparent glassboard representation of presentation content, where a user can modify the GUI object during the design of presentation content. Processing device view 300 further illustrates a receipt of a user action 306, selecting the GUI menu feature 304, to automatically initiate inclusion of an exemplary GUI object within the slide representation 302.

Figure 3B:
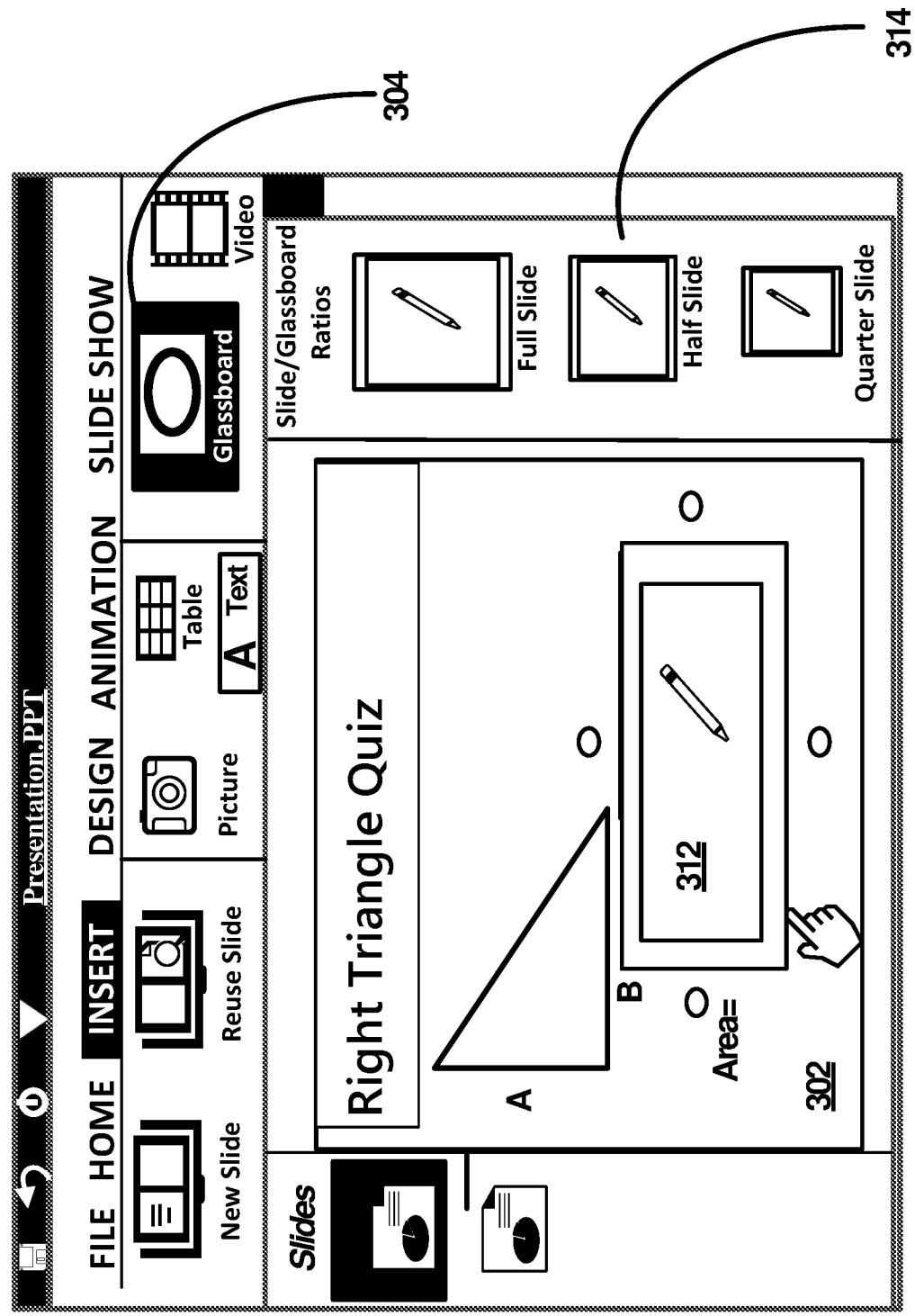

FIG. 3B presents processing device view 310, illustrating a continued example of the slide representation 302 that is shown in processing device view 300 (FIG. 3A). Processing device view 310 illustrates the result of receipt of user action 306 (FIG. 3A), which selects the GUI menu feature 304 to automatically initiate inclusion of an exemplary GUI object within the slide representation 302. As a result of receipt of user action 306, an exemplary GUI object 312 is automatically inserted into slide representation 302. As indicated in the foregoing description, a GUI object, added to the slide representation 302, is modifiable by a user. Selection indicators (e.g., surrounding white dots) provide a visual representation of modifiability of the GUI object 312.

Moreover, in some examples, the selection of GUI menu feature 304 can be a trigger for automatic rendering, in a GUI of GUI sub-menu 314. In alternative examples, GUI sub-menu 314 may be automatically rendered in the GUI based on a trigger of insertion of GUI object 312 into the slide representation 302 or even a receipt of a user action that selects GUI object 312 following insertion. In any example, GUI sub-menu 314 is an adapted GUI menu that provides programmed control over the sizing/formatting of GUI object 312 within slide representation 302. As previously referenced, editing of a size/format of GUI object 312, within slide representation 302, directly impacts how much of a displayed slide is rendered (during a presentation phase) as a transparent glassboard representation. As such, GUI sub-menu 314 provides selectable GUI elements that enable a user to automatically re-size/re-format a GUI object 312 so that the user does not have to manually modify the GUI object 312. Among other examples, GUI sub-menu 314 enables a user to resize a GUI object 312, relative to a size of a slide template (slide representation 302) to one of: a quarter of the size of the slide template (quarter slide); half of the size of the slide template (half slide); and full size of the slide template (full slide).

FIG. 3C presents processing device view 320, illustrating an example of presentation content being presented in real-time (e.g., a presentation phase). The example shown in processing device view 320 reflecting a real-time (or near real-time) presentation of slide representation 302 (shown in FIG. 3A), where a slide-based presentation deck, comprising a displayed slide 322, is presented in a GUI of a collaborative communication application/service (e.g., MICROSOFT® TEAMS®). As shown in processing device view 320, the GUI of the collaborative communication application/service enables users to toggle control over a presentation of content using a control feature menu 324. Control feature menu 324 comprises GUI elements enabling users to toggle control over: a presentation mode of the presentation content; a presenter of the presentation content (e.g., one or more camera feeds thereof); and stopping/starting a presentation. While not shown, another control feature that may be included in the control feature menu 324 is a control feature for managing editing of a displayed slide when in a specific presentation mode. For example, a presenter may wish to pass control over a presentation to another user, but not enable that other user to modify content associated with a displayed slide 322. In essence, such a feature may enable locking control over the layers of the transparent glassboard representation. Other control features that may be utilized to control a presentation of content are known to one skilled in the field of art. Camera feeds associated with a presentation, provided through the collaborative communication application/service, are also displayed in a camera feed GUI feature 324 identifying camera feeds associated with a presentation. In the example shown in processing device view 320 a teacher feed is designated as the presenter of the presentation content (e.g., displayed slide 322). When a transparent glassboard representation is rendered for the displayed slide 322, the teacher feed would be rendered within the displayed slide 322 as part of the transparent glassboard representation (e.g., a camera feed layer thereof would present the teacher feed underlaying other content layers).

Processing device view 320 comprises the receipt of a user action 328, selecting, from the control feature menu 324, a GUI feature associated with control over the presentation mode of the presentation. The GUI feature for control over presentation mode allows user control over whether a displayed slide 322 is traditionally rendered or alternatively rendered in a transparent glassboard representation. It is noted that a user, through selection of the GUI feature for control over presentation mode, can toggle between different presentation modes described herein. In the example shown in processing device view 320, user action 328 selects a GUI sub-feature, from the control feature menu 324, that triggers automatic rendering of the displayed slide 322 in a transparent glassboard representation. In doing so, a presentation mode of the displayed slide 322 may be automatically converted and rendered to display a transparent glassboard representation (from a traditional representation of a slide). It is noted that displayed slide 322, being a two-dimensional static image as shown in FIG. 3A, displays a non-limiting visual example of a transparent glassboard representation. Processing device view 320 provides feed feature 330, that highlights a result of processing describes herein that renders a presenter camera feed (e.g., live camera feed of the teacher) as part of the transparent glassboard representation. Feed feature 330 is intended to show that a camera feed layer (sublayer of layering configuration) renders the teacher feed in the sublayer of the transparent glassboard representation, which is then presented underlaying other content layers of the transparent glassboard representation. As a visual example, a content portion ("X" "Multiply sides?") is shown as overlapping the teacher feed in the transparent glassboard representation. This highlights that a camera feed is underlaying the original content of the displayed slide 322. In actual implementation, a camera feed is rendered with a level of transparency relative to original content (and/or new content added by a user) so that the camera feed appears as being seamlessly integrated with other content layers when presented in a transparent glassboard representation. The remainder of the whitespace on the slide is also rendered as transparent, where users can interact with the transparent glassboard representation to add new content layers overlaying the camera feed layer, a transparent glassboard layer and the original content of the displayed slide 322. For instance, a user may select a GUI feature configured to enable a pen tool, where a user can then add written content within the confines of the slide via the transparent glassboard representation.

Figure 3D:
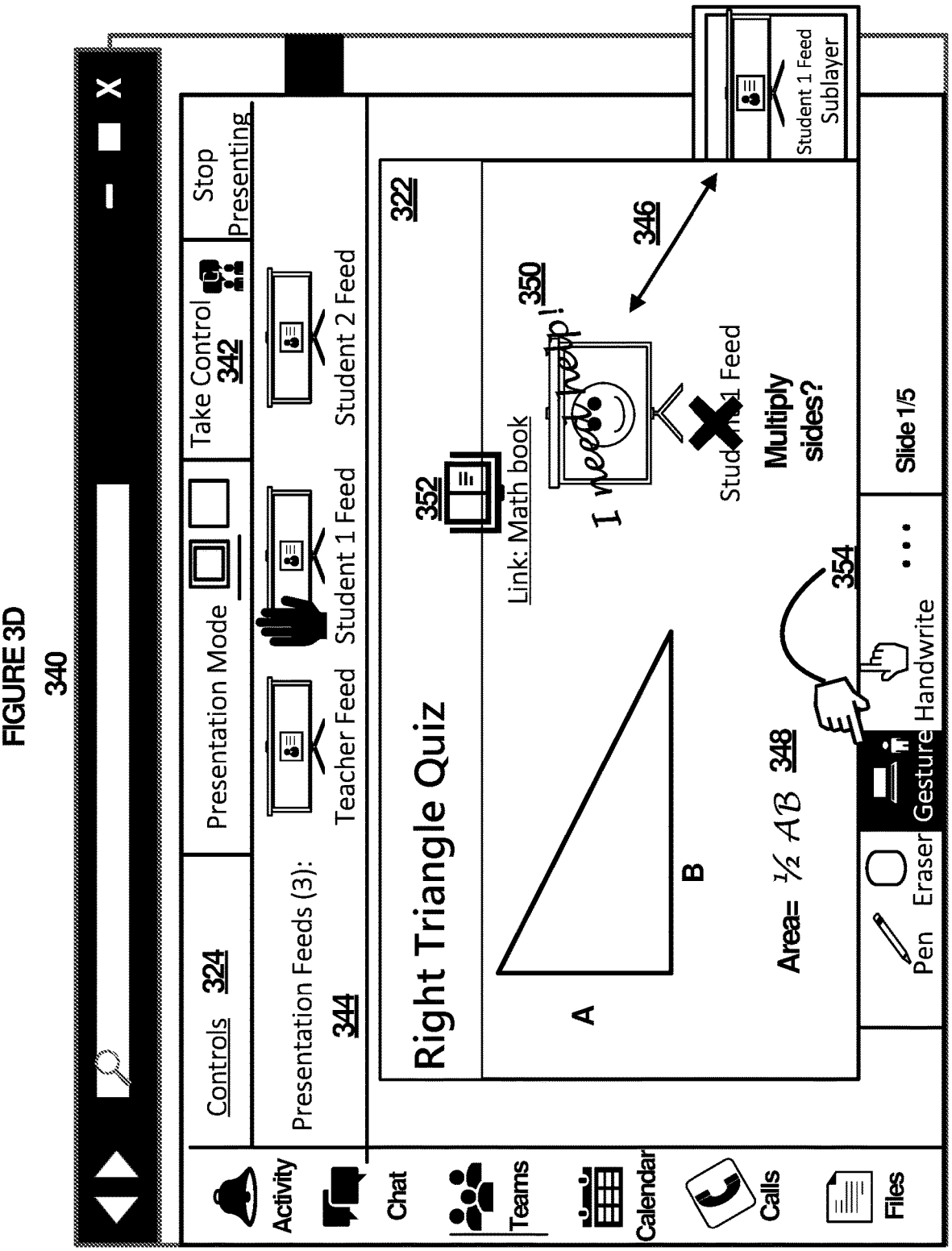

FIG. 3D presents processing device view 340, illustrating a continued example of the displayed slide 322 rendered as part of a transparent glassboard representation (shown in processing device view 320 (FIG. 3C)). Processing device view 340 illustrates an example where control over presentation content has changed from a teacher feed ("Teacher Feed") to a student feed ("Student 1 Feed"). This may occur based on selection, from the control feature menu 324, of a GUI feature 342 associated with transfer (pass control) of control over the presentation content. For example, a teacher (e.g., "Teacher Feed") may pass, via GUI feature 342, control over the presentation content to one of its students (e.g., "Student 1 Feed") to solve a math problem identified in the presentation content. As can be seen in processing device view 340, an updated camera feed GUI feature 344 (shown as GUI feature 326 in FIG. 3C) reflects that control over the presentation content has passed to a student user (e.g., "Student 1 Feed"). The transparent glassboard representation is updated for the displayed slide 322. Processing device view 340 provides feed feature 346, highlighting a result of update of a presenter camera feed (e.g., live camera feed of "Student 1") as part of the transparent glassboard representation. Feed feature 346 is intended to show that a camera feed layer (sublayer of layering configuration) renders the "Student 1 Feed" in the sublayer of the transparent glassboard representation, which is then presented underlaying other content layers of the transparent glassboard representation.

Furthermore, processing device view 340 further illustrates the update of multiple content layers of the transparent glassboard representation. For example, the student associated with "Student 1 Feed" has added, via an exemplary inking layer, multiple instances of written content to the transparent glassboard representation. A first instance of written content 348 is added using the virtual glassboard provided by the transparent glassboard representation, where the first instance of written content 348 is added relative to original content of the displayed slide 322. Original content of the displayed slide 322 comprises a right triangle and a partial math equation ("Area=") for the right triangle that requires a user (i.e., associated with "Student 1 Feed") to complete the math equation. In processing device view 340, the first instance of written content 348 ("½ AB") completes the math equation for the right triangle. A second instance of written content 350 is added using the virtual glassboard that is provided by the transparent glassboard representation. The second instance of written content 350 ("I Need Help") is a request for additional user assistance. As can be seen by rendering of the respective first and second instances of written content, the inking layer overlays the transparent glassboard layer and the camera feed layer.

Additionally, an instance of augmented content 352 ("Link: Math Book") is also added to the transparent glassboard representation. As can be seen by rendering of the augmented content 352 within the transparent glassboard representation, the augmented content layer overlays the transparent glassboard layer and the camera feed layer. While the augmented content 352 is not overlapping with content added in the inking layer in FIG. 3D, it is further to be recognized that the augmented content layer overlays the inking layer. However, in some alternative examples, an inking layer and an augmented content layer may be the same content layer, where any type of new content (that is not original content of a displayed slide 322) would be rendered concurrently in the same content layer.

Moreover, processing device view 340 further illustrates the receipt of a user action 354 modifying a control feature of the collaborative communication application or service so that the receipt of a gesture is recognized. As previously referenced, trained AI processing (e.g., one or more trained AI models) is applied to execute a contextual analysis of a presentation, including signal data received during the presentation. This may comprise signal data received through user gestures, analysis of user speech, content added (e.g., via an inking layer and/or an augmented content layer) by users during the presentation. Analyzing of signal data, including user-specific signal data, occurs in compliance with user privacy regulations and policies. For instance, users may consent to monitoring of signal data to improve user experience and operation of applications/services associated with a software data platform. Through execution of trained AI processing, automatic determinations may be generated to automatically to manage a state of a transparent glassboard representation of presentation content.

As an example, user action 354 may provide an explicit indication to monitor interactions provided by users through respective camera feeds to determine if a gesture executed by a user impacts a rendering of the transparent glassboard representation. For example, the presenter ("Student 1 Feed") may execute a hand motion gesturing to indicate a request for help. A trained AI model is applied to execute a contextual analysis of a presentation, including signal data received during the presentation. This may comprise signal data received through user gestures, analysis of user speech, content added (e.g., via an inking layer and/or an augmented content layer) by users during the presentation. In other examples, a trained AI model is continuously applied during the presentation of presentation content to aid management of states of a transparent glassboard representation.

Figure 3E:
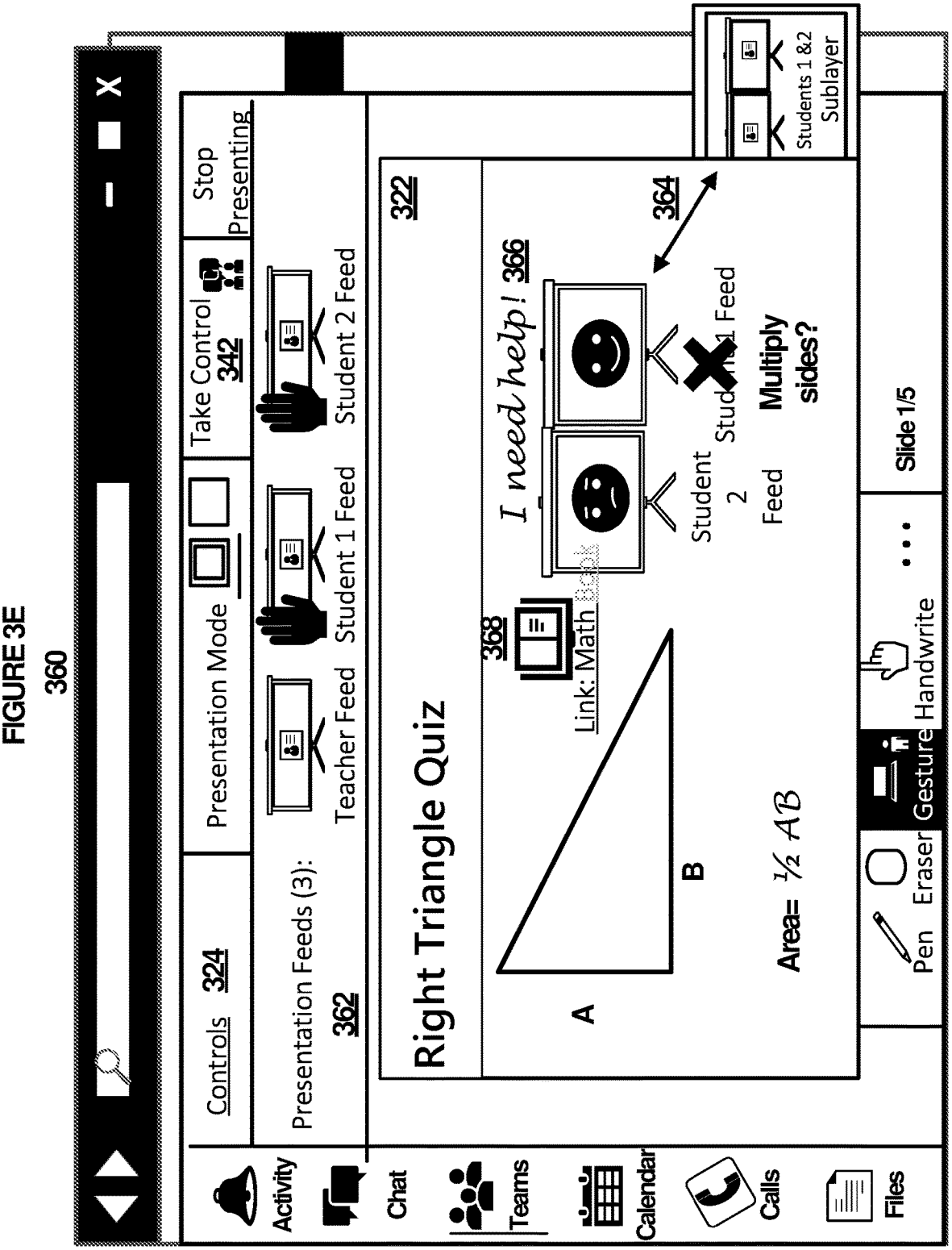
Figure 3F:
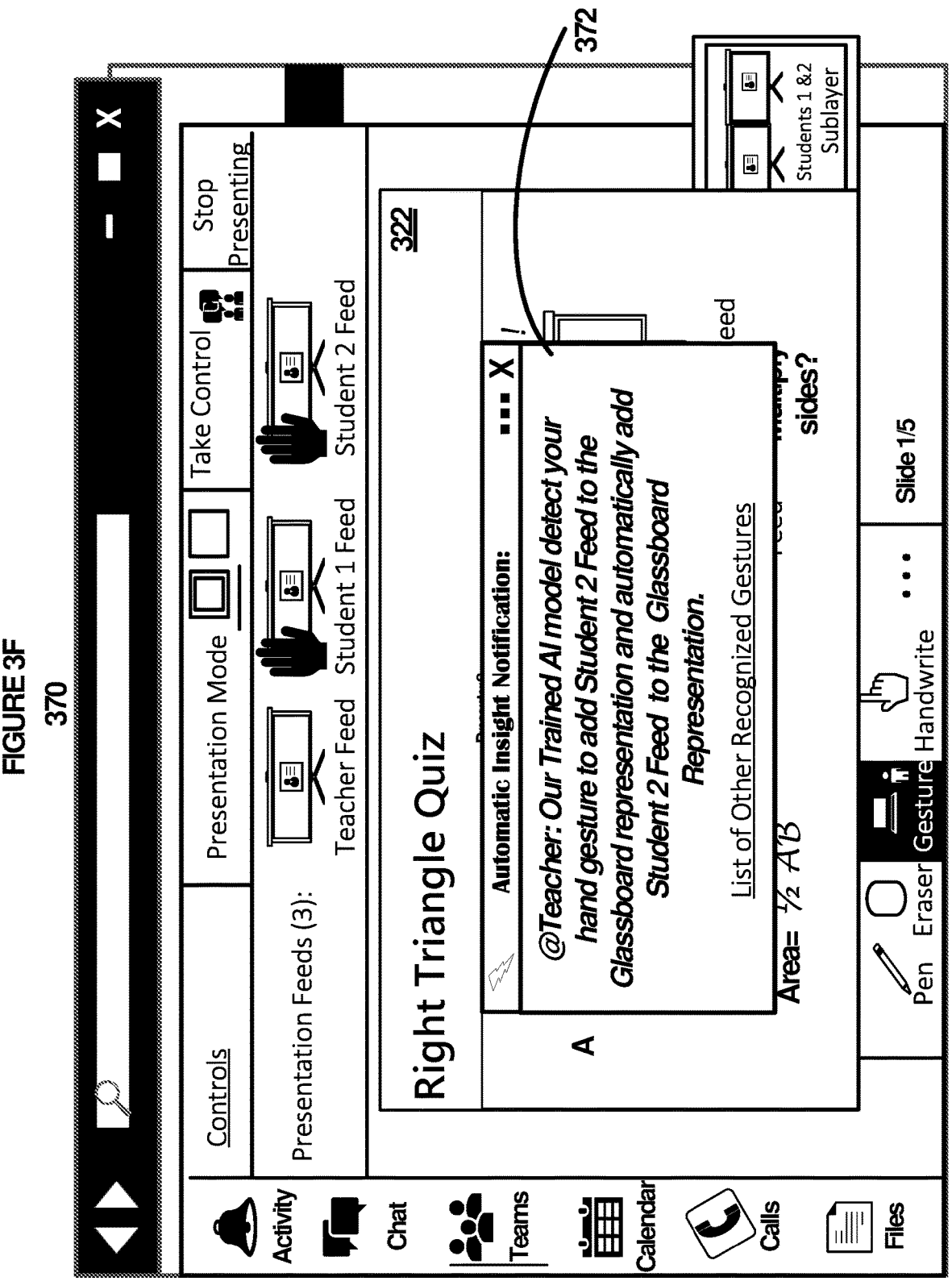

FIG. 3E presents processing device view 360, illustrating a continued example of the displayed slide 322 rendered as part of a transparent glassboard representation (shown in processing device view 340 (FIG. 3D)). As indicated in processing device view 340, a user action 354 (FIG. 3C) was executed identifying that the user intends to enter a gesture input. A trained AI model is applied to analyze a context of the presentation, including gestures received via a camera feed (e.g., live camera feed), and utilize determinations therefrom to manage a state of the transparent glassboard representation. Processing device view 360 illustrates a result of determinations made by a trained AI model, where a received gesture (e.g., from "Student 1 Feed") resulted in the addition of a second camera feed ("Student 2 Feed") being added to the transparent glassboard representation.

As a starting point, processing device view 360 illustrates an automatic update to a presentation feed GUI feature 362 indicating that presenter control over the presentation content is updated to include multiple users/multiple camera feeds. For instance, presenters of the presentation content are now a first camera feed is that of "Student 1 Feed" and a second camera that is "Student 2 Feed". Processing device view 360 provides feed feature 346, highlighting a result of update of a presenter camera feed (e.g., live camera feed of "Student 1") as part of the transparent glassboard representation. Feed feature 364 is intended to show that a camera feed layer (sublayer of layering configuration) renders both the "Student 1 Feed" and "Student 2 Feed" in the sublayer of the transparent glassboard representation, which is then presented underlaying other content layers of the transparent glassboard representation. This update may occur automatically as a result of determinations made by a trained AI model.

Furthermore, processing device view 360 further illustrates the automatic modification of content portions based on determinations generated from contextual analysis of a presentation. As previously indicated, one or more layers of a transparent glassboard representation may be automatically modified based on a result of the contextual analysis of the presentation. Content portions in one or more layers may be modified in size, formatting, transparency, added/removed, etc. In the example shown, a first modification 366 occurs to written content, where a positioning (locational) and orientation (angle) of written content ("I Need Help"), added via an inking layer, is automatically modified based on a change to the context of the presentation (e.g., the addition of a second camera feed to the transparent glassboard representation of the displayed slide 322). Furthermore, a second modification 368 occurs where a positioning (locational) and transparency (angle) of digital content ("Link: Math Book"), added via an augmented content layer, is automatically modified based on a change to the context of the presentation (e.g., the addition of a second camera feed to the transparent glassboard representation of the displayed slide 322). As can be seen in processing device view 360, the second modification 368 overlaps the digital content ("Link: Math Book") with a camera feed ("Student 2 Feed"), where a determination is made to modify a transparency of a portion of the digital content to enable viewable rendering of the overlapping content.

FIG. 3F presents processing device view 370, illustrating a continued example of the displayed slide 322 rendered as part of a transparent glassboard representation (shown in processing device view 360 (FIG. 3E)). Processing device view 370 illustrates the presentation of an automatic data insight notification 372, notifying a user of automatic processing to update the presentation content relative to a change in the context to the transparent glassboard representation. For instance, the automatic data insight notification 372 notifies a user of functionality applied to improve a user experience, providing a rationale why the state of the transparent glassboard representation was automatically updated. Furthermore, automatic data insight notification 372 may further provide additional context data such as help/assistance information that helps a user better understand utility provided through an application/service. For instance, a list of recognized gestures, that may trigger automatic update to a transparent glassboard representation, may be provided for a user who wishes to gain more information about functionality provided thereto. This further improves efficiency and usability of applications/services during subsequent usage.

FIG. 4 illustrates a computing system 401 suitable for implementing processing operations described herein related to management over transparent glassboard representations of presentation content, with which aspects of the present disclosure may be practiced. As referenced above, computing system 401 may be configured to implement processing operations of any component described herein including an exemplary glassboard management component (106 of FIG. 1A). As such, computing system 401 may be configured as a specific purpose computing device that executes specific processing operations to solve the technical problems described herein including those pertaining to integration of a transparent glassboard representation of presentation content. For instance, a transparent glassboard representation enables integration of a virtual glassboard within presentation content, thereby enhancing user interaction with presentation in an single application/service experience. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/services or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), diagram 150 (FIG. 1B), method 200 (FIG. 2A), method 250 (FIG. 2B) and/or the accompanying description of FIGS. 3A-3F.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable, and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more glassboard management component(s) 406a as described herein. Software 405 may further comprise application/service component(s) 406b that provide applications/services as described in the foregoing description such as applications/services that enable access to presentation content (and templates thereof) including slide-based presentation applications/services and collaborative communication applications/services usable to enable users to conduct electronic meetings, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: GUI objects configured to enable activation of a transparent glassboard representation; editing of GUI objects configured to enable activation of transparent glassboard representations; GUI elements (including GUI menus) and application command control features configured to enable management of exemplary GUI objects in conjunction with presentation content (e.g., slide-based presentations); notifications of data insights including data insight suggestions for management of presentation of content (e.g., presented in a transparent glassboard representation; contextual representations (e.g., user-specific and/or communication-specific) of data insights including exemplary data insight suggestions; rendering and synchronization of representations of presentation content (e.g., having transparent glassboard representations) across different host application/service endpoints via implementation of a collaborative framework; and GUI elements for management of recording and playback of presentation content that comprises live camera feeds, transparent glassboard representations, among other examples. User interface system 409 comprises a graphical user interface that presents graphical user interface elements representative of any point in the processing described in the foregoing description including processing operations described in system diagram 100 (FIG. 1A), diagram 150 (FIG. 1B), method 200 (FIG. 2A), method 250 (FIG. 2B) and front-end representations related to the description of FIGS. 3A-3F. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., a collaborative communication application/service, electronic meeting application/service, etc.) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of reboot estimates relative to updates to be applied to a computing device. For instance, a computer-implemented method may be executed across at least one computing device, including a system, to accomplish processing described herein.

In a non-limiting example where presentation content is designed, a first user action is received through a GUI of a presentation application or service. The first user action is an action to insert a GUI object, configured to activate a transparent glassboard representation, within a slide template of a slide-based presentation deck. In response to receiving the first user action, the GUI object is added to the slide template. An addition of the GUI object to the slide template adds the GUI object as an editable content portion within the slide template. In some examples, a second user action is received that modifies one or more of: receiving a second user action that modifies, within the slide template, one or more of: positioning of the GUI object and formatting of the GUI object. In response to receiving the second user action, a presentation of the GUI object, within the GUI, is updated within the slide template. The slide-based presentation deck is then rendered. Rendering of the slide-based presentation deck automatically activates the GUI object to present the transparent glassboard representation within a displayed slide when the displayed slide, associated with the slide template, is presented in a presentation mode of the presentation application or service.

Adding of the GUI object to the slide template automatically creates a layering configuration that provides an ordered arrangement of content layers to create the transparent glassboard representation in a rendering of the slide-based presentation deck. The layering configuration comprises: a camera feed layer, underlaying other layers of the layering configuration, that presents a camera feed within the displayed slide. The layering configuration further comprises a transparent glassboard layer that directly overlays the camera feed layer and presents a virtual glassboard providing a transparent representation of a slide including original content of a slide template associated with the slide. Furthermore, the layering configuration further comprises: an inking layer that directly overlays the transparent glassboard layer, including the original content, and the camera feed layer. The inking layer is configured to manage interaction of new written content, different from the original content, with the displayed slide, Exemplary new written content is addable to the displayed slide during a presentation of the displayed slide in the presentation mode. Moreover, the layering configuration further comprises: an augmented content layer that directly overlays the inking layer and further overlays the transparent glassboard layer, including the original content, and the camera feed layer. The augmented content layer is configured to manage an interaction of new digital content, different from the original content and the new written content, with the displayed slide. Exemplary new digital content is addable to the displayed slide during the presentation of the displayed slide in the presentation mode.

In further examples, the second user action, that updates the presentation of the GUI object within the slide template, is a selection, from a GUI menu configured to provide a plurality of predetermined sizing parameters for the GUI object, of a predetermined sizing parameter of the plurality of predetermined sizing parameters. In examples where the second user action is a selection from said GUI menu, the updating of the presentation of the GUI object automatically resizes the GUI object in the slide template based on the selection of the predetermined sizing parameter. Alternatively, the second user action is an action, received through a GUI, that modifies one or more of: an initial positioning of the GUI object and initial formatting of the GUI object within the slide template.

In additional technical instances, the adding of the GUI object to the slide template comprises automatically applying a trained AI model that is adapted to generate the representation of the GUI object for inclusion in the slide template based on analysis of one or more of data and metadata for the slide-based template. The automatically applying of the trained AI model comprises: determining an initial positioning of the GUI object and an initial formatting of the GUI object within the slide template based on a result of the analysis of the one or more of data and the metadata for the slide-based template; and automatically inserting the GUI object into the slide-based template based on a result of the determining of the initial positioning and the initial formatting of the GUI object. In some instances, the trained AI model is further adapted to automatically modify a transparency of one or more content portions of the original content based on the determining of the initial positioning of the GUI object and the initial formatting of the GUI object.

In other non-limiting examples where presentation content is rendered during a presentation, a slide-based presentation is displayed in a graphical user interface of a presentation application or service. In some technical instances, display of a slide-based presentation renders a GUI of the presentation application or service embedded within a GUI of another application/service that is used to execute a presentation (e.g., an electronic meeting).

An exemplary slide-based presentation comprises a plurality of slides presented in the presentation mode of the presentation application or service. Access to a slide is detected that comprises, within the slide, a GUI object configured to activate a transparent glassboard representation of the slide. In response to detecting the access to the slide, the transparent glassboard representation of the slide is automatically generated. Automatic generation of the transparent glassboard representation of the slide comprises: establishing a layering configuration that provides an ordered arrangement of content layers to create the transparent glassboard representation. The transparent glassboard representation is then automatically rendered in the GUI of the presentation application or service based on the layering configuration.

Continuing the above example, the layering configuration comprises: a camera feed layer, underlaying other layers of the layering configuration, that presents a camera feed. The layering configuration further comprises a transparent glassboard layer that directly overlays the camera feed layer and presents a virtual glassboard providing a transparent representation of a slide including original content of a slide template associated with the slide. The transparent glassboard layer presents a virtual glassboard within the displayed slide. Furthermore, the layering configuration further comprises: an inking layer that directly overlays the transparent glassboard layer, including the original content, and the camera feed layer. The inking layer is configured to manage interaction of new written content, different from the original content, with the displayed slide, Exemplary new written content is addable to the displayed slide during a presentation of the displayed slide in the presentation mode. Moreover, the layering configuration further comprises: an augmented content layer that directly overlays the inking layer and further overlays the transparent glassboard layer, including the original content, and the camera feed layer. The augmented content layer is configured to manage an interaction of new digital content, different from the original content and the new written content, with the displayed slide. Exemplary new digital content is addable to the displayed slide during the presentation of the displayed slide in the presentation mode.

Moreover, automatic generation of the transparent glassboard representation further comprises: detecting an original camera feed associated with the presentation of the slide; removing a background associated with the original camera feed; generating a modified camera feed for the original camera feed based on the removing of the background; and inserting the modified camera feed as content into the camera feed layer. In additional examples, automatic generation of the transparent glassboard representation further comprises: identifying bounds of the GUI object configured to activate the transparent glassboard representation within the slide; generating the virtual glassboard for the slide by rendering transparent pixels of the slide that are associated with the bounds of the GUI object; and inserting the virtual glassboard as content into transparent glassboard layer.

In further examples, an adapted GUI is configured to provide GUI features that enable automatic presentation of the transparent glassboard representation. For example, a computer-implemented method further comprises: receiving a GUI selection associated with a GUI feature configured to enable presentation of the transparent glassboard representation of the slide during the presentation. The transparent glassboard representation is automatically rendered based on a trigger of the receiving of the GUI selection of the GUI feature configured to enable presentation of the transparent glassboard representation.

Addition examples apply trained AI processing to automatically manipulate content presented in one or more layers of the transparent glassboard representation. For example, a computer-implemented method further comprises detection of a user gesture occurring during presentation of the transparent glassboard representation. In response to the receiving of the user gesture, a trained AI model is automatically applied, where the trained AI model is adapted to automatically manipulate content presented in one or more layers of the transparent glassboard representation based on a result of contextual analysis of the presentation. One or more layers of the transparent glassboard representation are automatically modified based on the result of the contextual analysis of the presentation generated by the trained AI model.

Reference has been made throughout this specification to "one example," "exemplary" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

The invention claimed is:

1. A computer-implemented method comprising:
receiving, through a graphical user interface (GUI) of a presentation application or service, a first user action to insert a GUI object within a slide template of a slide-based presentation deck presented in a design mode, wherein the GUI object is configured to activate a transparent glassboard representation when presented in a presentation mode;
wherein the design mode occurs prior to the presentation mode and, during the design mode, slides of the slide-based presentation deck are not being rendered for presentation to other users, and wherein during the presentation mode the slides are rendered for presentation to other users;
during the design mode:
in response to receiving the first user action, adding the GUI object to a slide associated with the slide template, wherein the GUI object comprises a region within the slide smaller than a size of the slide, wherein the adding adds the GUI object as an editable content portion within the slide;
receiving a second user action that modifies a positioning of the GUI object within the slide;
in response to receiving the second user action, updating, in the GUI, a presentation of the GUI object within the slide; and
during the presentation mode:
rendering the slides of the slide-based presentation deck a plurality of times for presentation at each of the plurality of times, wherein the rendering automatically activates the GUI object to present the transparent glassboard representation within the slide during display in response to the slide being presented in the presentation mode of the presentation application or service by a presenting user, wherein a layering configuration for the presentation comprises (1) a transparent glassboard layer that presents a virtual glassboard at the region of the GUI object providing a transparent representation of the slide during display overlaying an original content of the slide and (2) an inking layer that directly overlays the transparent glassboard layer, including the original content, wherein the inking layer is configured to manage interaction of new written content, different from the original content, within the slide, and wherein the new written content is addable to the slide during display by a non-presenting user during a presentation of the slide in the presentation mode;
wherein the inking layer is contained within the GUI object region.

2. The computer-implemented method of claim 1, wherein the adding of the GUI object to the slide automatically creates the layering configuration that provides an ordered arrangement of content layers to create the transparent glassboard representation in a rendering of the slide-based presentation deck, wherein the layering configuration comprises: a camera feed layer, underlaying other layers of the layering configuration, that presents a camera feed within the slide during display, and the transparent glassboard layer that directly overlays the camera feed layer.

3. The computer-implemented method of claim 2, wherein the automatically creating the layering configuration further comprises:
detecting an original camera feed associated with the presentation of the slide, removing a background associated with the original camera feed, generating a modified camera feed for the original camera feed based on the removing of the background, and inserting the modified camera feed as content into the camera feed layer.

4. The computer-implemented method of claim 3, wherein the layering configuration further comprises: an augmented content layer that directly overlays the inking layer and further overlays the transparent glassboard layer, including the original content, and the camera feed layer, wherein the augmented content layer is configured to manage an interaction of new digital content, different from the original content and the new written content, with the slide during display, and wherein the new digital content is addable to the slide during the presentation of the slide in the presentation mode.

5. The computer-implemented method of claim 1, wherein the second user action, that updates the presentation of the GUI object within the slide, is a selection, from a GUI menu configured to provide a plurality of predetermined sizing parameters for the GUI object, of a predetermined sizing parameter of the plurality of predetermined sizing parameters, and wherein the updating of the presentation of the GUI object automatically resizes the GUI object in the slide based on the selection of the predetermined sizing parameter.

6. The computer-implemented method of claim 1, wherein the adding of the GUI object to the slide comprises automatically applying a trained artificial intelligence (AI) model that is adapted to generate the representation of the GUI object for inclusion in the slide based on analysis of one or more of data and metadata for the slide, and wherein the automatically applying of the trained AI model comprises: determining an initial positioning of the GUI object and an initial formatting of the GUI object within the slide based on a result of the analysis of the one or more of data and the metadata for the slide, and automatically inserting the GUI object into the slide based on a result of the determining of the initial positioning of the GUI object and the initial formatting of the GUI object.

7. The computer-implemented method of claim 6, wherein the second user action modifies, within the slide, one or more of: the initial positioning of the GUI object and the initial formatting of the GUI object.

8. The computer-implemented method of claim 6, wherein the trained AI model is further adapted to automatically modify a transparency of one or more content portions of the original content based on the determining of the initial positioning of the GUI object and the initial formatting of the GUI object.

9. A system comprising:
at least one processor; and
a memory, operatively connected with the at least one processor, storing computer-executable instructions that, when executed by the at least one processor, causes the at least one processor to execute a method that comprises:
receiving, through a graphical user interface (GUI) of a presentation application or service, a first user action to insert a GUI object within a slide of a slide-based presentation comprising a plurality of slides presented in a design mode, wherein the GUI object is configured to activate a transparent glassboard representation of the slide when presented in a presentation mode;
wherein the design mode occurs prior to the presentation mode and, during the design mode, slides of the slide-based presentation are not being rendered for presentation to other users, and wherein during the presentation mode the slides are rendered for presentation to other users;
during the design mode:
in response to receiving the first user action, adding the GUI object to the slide, wherein the GUI object comprises a region within the slide smaller than a size of the slide, wherein the adding adds the GUI object as an editable content portion within the slide;
during the presentation mode:
displaying, in the GUI of the presentation application or service, the slide-based presentation in the presentation mode of the presentation application or service controlled by a presenter user;
detecting access to the slide the GUI object configured to activate the transparent glassboard representation of the slide;
in response to detecting the access to the slide, automatically generating the transparent glassboard representation of the slide, wherein the automatically generating the transparent glassboard representation of the slide comprises:
establishing a layering configuration that provides an ordered arrangement of content layers to create the transparent glassboard representation, wherein the layering configuration comprises:
a camera feed layer, underlaying other layers of the layering configuration, that presents a camera feed,
a transparent glassboard layer that directly overlays the camera feed layer, wherein the transparent glassboard layer presents a virtual glassboard at the region of the GUI object providing a transparent representation of the slide overlaying an original content of the slide, and
an inking layer that directly overlays the transparent glassboard layer and further overlays the original content and the camera feed layer, wherein the inking layer is configured to manage interaction of new written content, different from the original content, with the slide, and wherein the new written content is addable to the slide during a presentation of the slide in the presentation mode, wherein a portion of the new written content is provided by a non-presenting user in the presentation mode, wherein the inking layer is contained within the GUI object region; and
automatically rendering the transparent glassboard representation in the GUI of the presentation application or service based on the layering configuration.

10. The system of claim 9, wherein the establishing of the layering configuration further comprises an augmented content layer that directly overlays the inking layer and further overlays the transparent glassboard layer, including the original content, and the camera feed layer, wherein the augmented content layer is configured to manage an interaction of new digital content, different from the original content and the new written content, with the slide, and wherein the new digital content is addable to the slide during the presentation of the slide in the presentation mode.

11. The system of claim 9, wherein the automatically generating of the transparent glassboard representation further comprises: detecting an original camera feed associated with the presentation of the slide, removing a background associated with the original camera feed, generating a modified camera feed for the original camera feed based on the removing of the background, and inserting the modified camera feed as content into the camera feed layer.

12. The system of claim 9, wherein the automatically generating of the transparent glassboard representation further comprises: identifying bounds of the GUI object configured to activate the transparent glassboard representation within the slide, generating the virtual glassboard for the slide by rendering transparent pixels of the slide that are associated with the bounds of the GUI object, and inserting the virtual glassboard as content into transparent glassboard layer.

13. The system of claim 9, wherein the method, executed by the at least one processor, further comprises: receiving, a GUI selection of a GUI feature configured to enable presentation of the transparent glassboard representation of the slide during the presentation, and wherein the automatically rendering of the transparent glassboard representation in the GUI occurs based on a trigger of the receiving of the GUI selection of the GUI feature configured to enable presentation of the transparent glassboard representation.

14. The system of claim 9, wherein the method, executed by the at least one processor, further comprises:
detecting a user gesture occurring during presentation of the transparent glassboard representation based on a camera feed associated with a user making the user gesture; and
in response to detecting the user gesture, automatically applying a trained artificial intelligence (AI) model that is adapted to automatically manipulate content presented in one or more layers of the transparent glassboard representation based on a result of contextual analysis of the presentation; and
automatically modifying the one or more layers of the transparent glassboard representation based on the result of the contextual analysis of the presentation generated by the trained AI model.

15. A computer-implemented method comprising:
receiving, through a graphical user interface (GUI) of a presentation application or service, a first user action to insert a GUI object within a slide of a slide-based presentation comprising a plurality of slides presented in a design mode, wherein the GUI object is configured to activate a transparent glassboard representation of the slide when presented in a presentation mode;
wherein the design mode occurs prior to the presentation mode and, during the design mode, the plurality of slides are not being rendered for presentation to other users, and wherein during the presentation mode the plurality of slides are rendered for presentation to other users;
during the design mode:
in response to receiving the first user action, adding the GUI object to the slide, wherein the GUI object comprises a region within the slide smaller than a size of the slide, wherein the adding adds the GUI object as an editable content portion within the slide;
during the presentation mode:
displaying, in the GUI of the presentation application or service, the slide-based presentation in the presentation mode of the presentation application or service controlled by a presenter user;
detecting access to the slide that comprises the GUI object configured to activate the transparent glassboard representation of the slide;
in response to detecting the access to the slide, automatically generating the transparent glassboard representation of the slide, wherein the automatically generating the transparent glassboard representation of the slide comprises:
establishing a layering configuration that provides an ordered arrangement of content layers to create the transparent glassboard representation, wherein the layering configuration comprises:
a camera feed layer, underlaying other layers of the layering configuration, that presents a camera feed,
a transparent glassboard layer that directly overlays the camera feed layer, wherein the transparent glassboard layer presents a virtual glassboard at the region of the GUI object providing a transparent representation of the slide overlaying an original content of the slide, and
an inking layer that directly overlays the transparent glassboard layer and further overlays the original content and the camera feed layer, wherein the inking layer is configured to manage interaction of new written content, different from the original content, with the slide, and wherein the new written content is addable to the slide during a presentation of the slide in the presentation mode, wherein a portion of the new written content is provided by a non-presenting user in the presentation mode, wherein the inking layer is contained within the GUI object region; and
automatically rendering the transparent glassboard representation in the GUI of the presentation application or service based on the layering configuration.

16. The computer-implemented method of claim 15, wherein the establishing of the layering configuration further comprises an augmented content layer that directly overlays the inking layer and further overlays the transparent glassboard layer, including the original content, and the camera feed layer, wherein the augmented content layer is configured to manage an interaction of new digital content, different from the original content and the new written content, with the slide, and wherein the new digital content is addable to the slide during the presentation of the slide in the presentation mode.

17. The computer-implemented method of claim 15, wherein the automatically generating of the transparent glassboard representation further comprises: detecting an original camera feed associated with the presentation of the slide, removing a background associated with the original camera feed, generating a modified camera feed for the original camera feed based on the removing of the background, and inserting the modified camera feed as content into the camera feed layer.

18. The computer-implemented method of claim 15, wherein the automatically generating of the transparent glassboard representation further comprises: identifying bounds of the GUI object configured to activate the transparent glassboard representation within the slide, generating the virtual glassboard for the slide by rendering transparent pixels of the slide that are associated with the bounds of the GUI object, and inserting the virtual glassboard as content into transparent glassboard layer.

19. The computer-implemented method of claim 15, further comprising: receiving, a GUI selection of a GUI feature configured to enable presentation of the transparent glassboard representation of the slide during the presentation, and wherein the automatically rendering of the transparent glassboard representation in the GUI occurs based on a trigger of the receiving of the GUI selection of the GUI feature configured to enable presentation of the transparent glassboard representation.

20. The computer-implemented method of claim 15, further comprising:
- detecting a user gesture occurring during presentation of the transparent glassboard representation based on a camera feed associated with a user making the user gesture;
- in response to detecting the user gesture, automatically applying a trained artificial intelligence (AI) model that is adapted to automatically manipulate content presented in one or more layers of the transparent glassboard representation based on a result of contextual analysis of the presentation; and
- automatically modifying the one or more layers of the transparent glassboard representation based on the result of the contextual analysis of the presentation generated by the trained AI model.

* * * * *